United States Patent
Han et al.

(10) Patent No.: US 7,782,810 B2
(45) Date of Patent: Aug. 24, 2010

(54) APPARATUS AND METHOD FOR TRANSMITTING/RECEIVING PACKET DATA SYMBOL IN A MOBILE COMMUNICATION SYSTEM

(75) Inventors: Jin-Kyu Han, Suwon-si (KR); Beom-Sik Bae, Suwon-si (KR); Hwan-Joon Kwon, Hwaseong-si (KR); Dong-Hee Kim, Yongin-si (KR); Youn-Sun Kim, Seongnam-si (KR); Yu-Chul Kim, Suwon-si (KR); Jung-Soo Jung, Seoul (KR); Dae-Gyun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1215 days.

(21) Appl. No.: 11/292,271

(22) Filed: Dec. 2, 2005

(65) Prior Publication Data

US 2006/0120270 A1 Jun. 8, 2006

(30) Foreign Application Priority Data

Dec. 3, 2004 (KR) ............... 10-2004-0101457
Sep. 13, 2005 (KR) ............... 10-2005-0085450

(51) Int. Cl.
*H04B 7/185* (2006.01)
(52) U.S. Cl. ............... 370/318; 370/491
(58) Field of Classification Search ............... None
See application file for complete search history.

(56) References Cited

U.S. PATENT DOCUMENTS 5,646,935 A * 7/1997 Ishikawa et al. ............ 370/207
2003/0050086 A1* 3/2003 Lee et al. ............ 455/522

(Continued)

FOREIGN PATENT DOCUMENTS

| EP | 0952696 | 10/1999 |
| JP | 2004-336670 | 11/2004 |
| KR | 20030019754 | 3/2003 |

(Continued)

OTHER PUBLICATIONS

Chen et al.; "Pilot Power Allocation for OFDM Systems", 57th IEEE Semiannual Vehicular Technology Conference, Apr. 22-25, 2003, pp. 1283-1287, vol. 2, IEEE.

(Continued)

*Primary Examiner*—Chi H Pham
*Assistant Examiner*—Fan Ng
(74) *Attorney, Agent, or Firm*—Roylance, Abrams, Berdo & Goodman, L.L.P.

(57) ABSTRACT

An apparatus and method transmits a packet data symbol in a high-rate packet data (HRPD) mobile communication system for broadcasting service. A transmission processor generates a modulated symbol by encoding, interleaving and modulating a physical layer packet to be transmitted, and arranges the modulated symbol in a data tone. A tone inserter inserts a guard tone and a pilot tone into the data tone. A tone power allocator sets a different pilot-to-data tone power ratio according to a position of a slot, in which the packet data symbol is included, and allocates power according to the pilot-to-data tone power ratio. A transmitter transmits the packet data symbol.

19 Claims, 14 Drawing Sheets

U.S. PATENT DOCUMENTS

| | | |
|---|---|---|
| 2004/0066772 A1* | 4/2004 | Moon et al. ............ 370/342 |
| 2004/0166887 A1 | 8/2004 | Laroia et al. |
| 2005/0094552 A1 | 5/2005 | Abe et al. |

FOREIGN PATENT DOCUMENTS

| | | |
|---|---|---|
| RU | 2111619 | 5/1998 |
| RU | 2183387 | 6/2002 |
| WO | 2004-043028 | 5/2004 |
| WO | 2004-056022 | 7/2004 |
| WO | WO 2005/011165 A1 | 2/2005 |

OTHER PUBLICATIONS

Dong et al.; "Optimal Design and Placement of Pilot Symbols for Channel Estimation," IEEE Transactions on Signal Processing, Dec. 2002, vol. 50, No. 12, pp. 3055-3069, IEEE.

Ohno et al.; "Optimal Training and Redundant Precoding for Block Transmissions with Application to Wireless OFDM," Proceedings of the International Conference on Acoustics, Speech and Signal Processing, May 7-11, 2001, pp. 2389-2392, vol. 4, IEEE.

Cai et al.; "Error Probability Minimizing Pilots for OFDM With M-PSK Modulation Over Rayleigh-Fading Channels," IEEE Transactions on Vehicular Technology, Jan. 2004, pp. 146-155, vol. 53, No. 1, IEEE.

Simeone et al.; "Adaptive Pilot Pattern for OFDM Systems," 2004 IEEE Communications Society, Jun. 20-24, 2004, pp. 978-982, vol. 2, IEEE.

\* cited by examiner

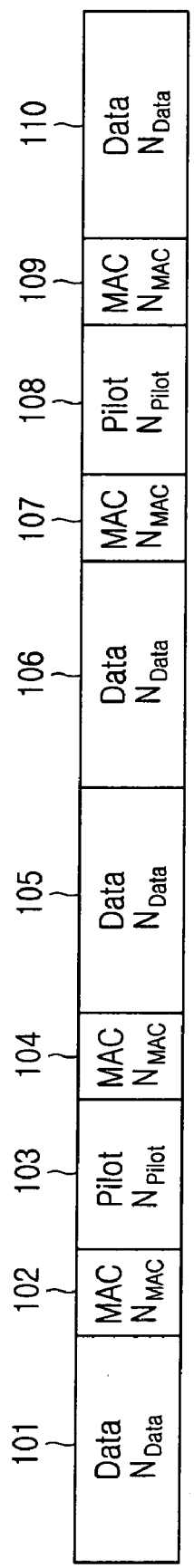
FIG.1
(CONVENTIONAL)

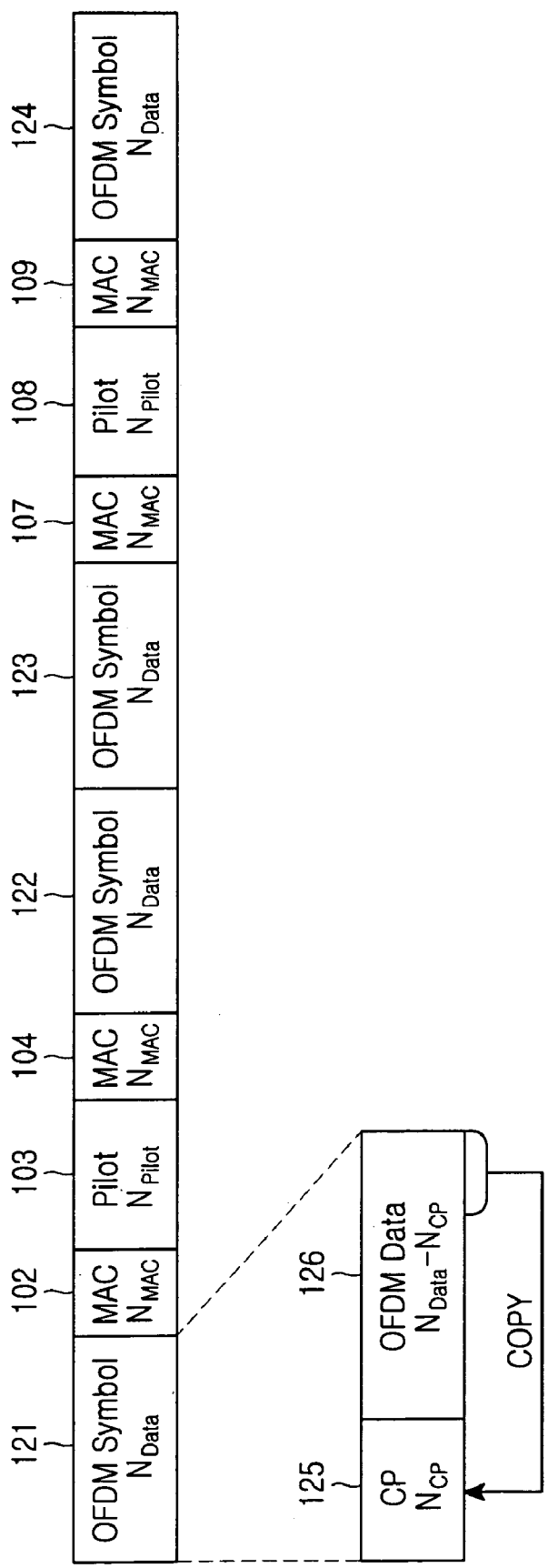
FIG. 2
(CONVENTIONAL)

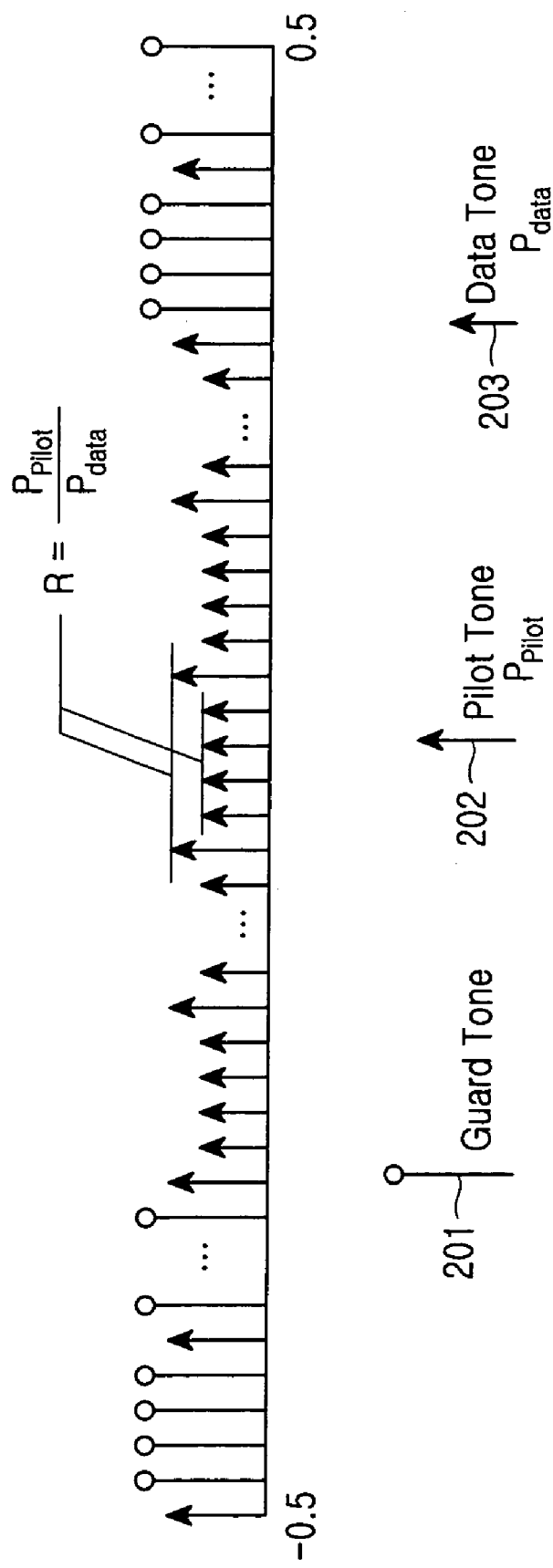
FIG. 3
(CONVENTIONAL)

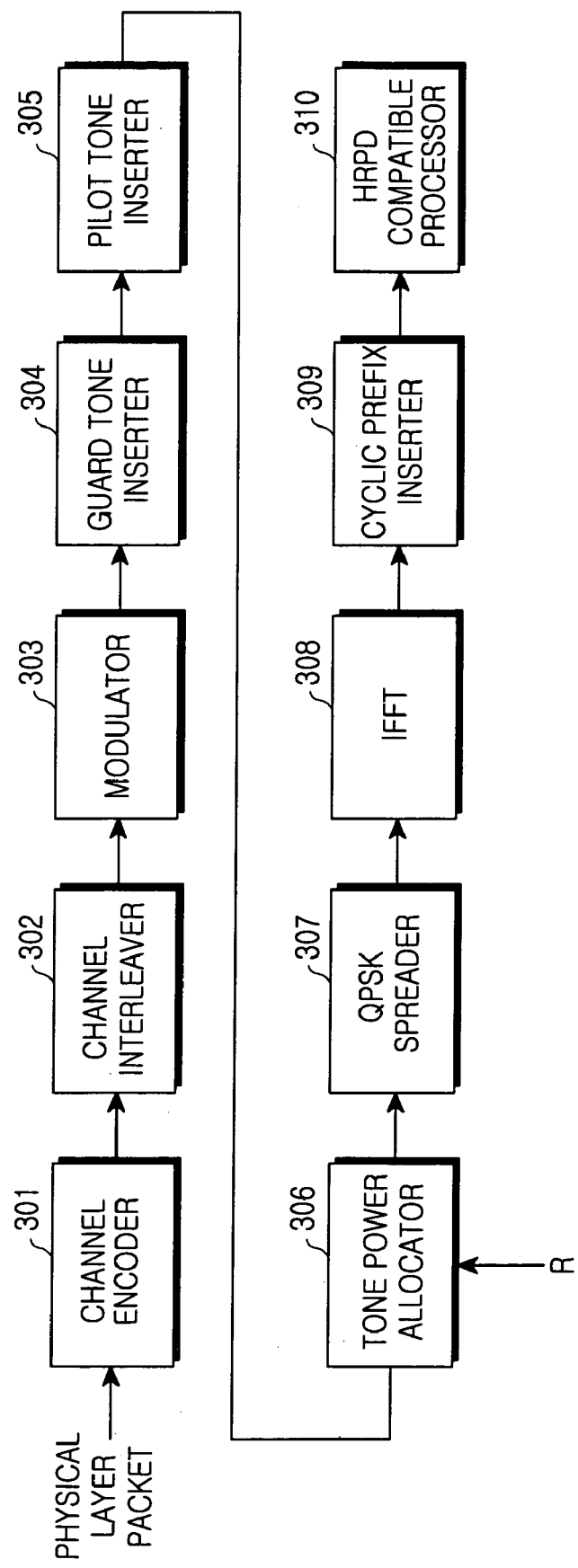
FIG.4
(CONVENTIONAL)

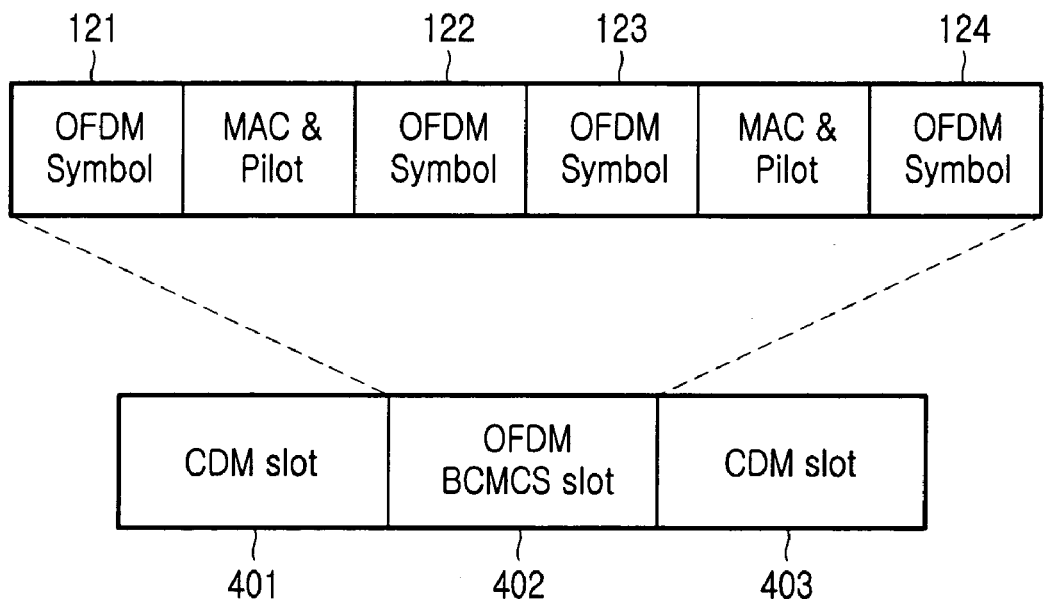
FIG.5A
(CONVENTIONAL)
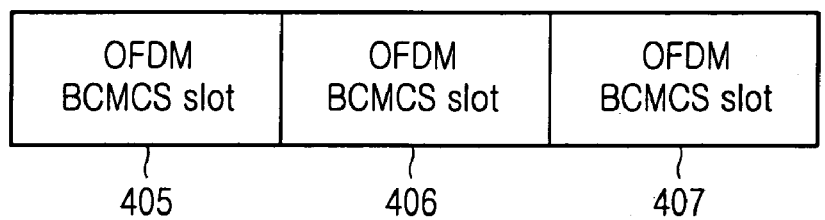
FIG.5B
(CONVENTIONAL)

APPARATUS AND METHOD FOR TRANSMITTING/RECEIVING PACKET DATA SYMBOL IN A MOBILE COMMUNICATION SYSTEM

CROSS-REFERENCE TO RELATED APPLICATIONS

This application claims the benefit under 35 U.S.C. §119 (a) of Korean Patent Applications Serial Nos. 2004-101457 and 2005-85450 filed in the Korean Intellectual Property Office on Dec. 3, 2004 and Sep. 13, 2005, respectively, the entire contents of both of which are hereby incorporated by reference.

BACKGROUND OF THE INVENTION

1. Field of the Invention

The present invention relates generally to an apparatus and method for providing broadcasting service in a wireless packet communication system. In particular, the present invention relates to an apparatus and method for controlling power allocation to pilot tones in a broadcasting system using an Orthogonal Frequency Division Multiplexing (OFDM) transmission scheme.

2. Description of the Related Art

Conventionally, a wireless transmission scheme for providing broadcasting service such as Broadcast and Multicast Service (BCMCS) has been developed aimed at reception at a fixed terminal or reception at a low-data rate mobile terminal. Active research is now being performed on technology for allowing a subscriber to receive the broadcasting service using a small-sized terminal in a high-speed mobile environment. Broadcasting technologies such as Digital Multimedia Broadcasting (DMB) and Digital Video Broadcast Handheld (DVB-H), the typical BCMCS technologies, have been developed to allow a subscriber to receive high-quality broadcasting with a small portable terminal. In addition, research also has been conducted on the DMB and DVB-H technologies to progress the existing unidirectional broadcasting service to bidirectional broadcasting service. To this end, a plan to use the existing wire/wireless communication network as a return channel is being taken into account. However, this approach has a limitation in implementing bidirectional broadcasting because different transmission schemes are used for broadcasting and communication.

Generally, a wireless packet communication system supports communication service in which information is exchanged between a particular transmitting subscriber and a particular receiving subscriber. In the communication service, different receiving subscribers receive information through different channels. However, the wireless packet communication system suffers performance degradation due to inter-channel interference because of its low channel-to-channel isolation. In order to increase the channel-to-channel isolation, the current mobile communication system uses the cellular concept along with such multiple access schemes as Code Division Multiple Access (CDMA), Time Division Multiple Access (TDMA), and Frequency Division Multiple Access (FDMA). However, even the use of these technologies cannot completely remove the interference.

BCMCS service, unlike communication service, allows a transmitting subscriber to unilaterally transmit information to a plurality of receiving subscribers. There is no interference between subscribers receiving the same information because they share the same channel. However, mobile broadcasting service suffers performance degradation due to multipath fading occurring in the high-speed mobile environment. In order to address this problem, broadcasting systems designed to support mobile reception, such as Digital Video Broadcast Terrestrial (DVB-T), DVB-H, and Digital Audio Broadcast (DAB) systems, use the OFDM transmission scheme.

The use of the OFDM transmission scheme in the broadcasting systems can prevent multipath fading from causing self interference. Particularly, in broadcasting service, different base stations transmit the same broadcasting signals via a single frequency network (SFN). Thus, the OFDM transmission scheme is advantageous in that it can prevent interference between the broadcasting signals transmitted by different base stations. Therefore, application of the OFDM transmission scheme to broadcasting service can implement an interference-free environment, contributing to maximization of transmission efficiency.

A downlink of a High-Rate Packet Data (HRPD) mobile communication system uses TDMA as a multiple access scheme and Time Division Multiplexing/Code Division Multiplexing (TDM/CDM) as a multiplexing scheme.

FIG. 1 is a diagram illustrating a slot format of a downlink in a conventional HRPD mobile communication system.

As illustrated in FIG. 1, one slot has a repeated form of half slots. Pilots 103 and 108 with an $N_{Pilot}$-chip length are inserted in the centers of the half slots, and are used for channel estimation of a downlink at a receiving terminal. Medium Access Control (MAC) information 102, 104, 107 and 109 with an $N_{MAC}$-chip length, including uplink power control information and resource allocation information, is transmitted at both ends of the pilots 103 and 108. Actual transmission data 101, 105, 106 and 110 with an $N_{Data}$-chip length is transmitted before and after the MAC information 102, 104, 107 and 109. In this manner, pilots, MAC information, actual data are time-multiplexed by TDM.

The MAC and data information is multiplexed with Walsh codes by CDM, and in an HRPD downlink system, lengths of Pilot, MAC, and data blocks are set to $N_{Pilot}$=96 chips, $N_{MAC}$=64 chips, and $N_{Data}$=400 chip.

FIG. 2 is a diagram illustrating a slot format provided by inserting an OFDM symbol into a data transmission interval of an HRPD downlink slot for BCMCS service.

For HRPD downlink compatibility, positions and sizes of Pilot and MAC signals shown in FIG. 2 are matched to positions and sizes of Pilot and MAC signals shown in FIG. 1. That is, Pilots 103 and 108 with an $N_{Pilot}$-chip length are located in the centers of half slots, and MAC signals 102, 104, 107 and 109 with an $N_{MAC}$-chip length are located at both sides of the Pilot signals 103 and 108. Therefore, even the existing HRPD terminal not supporting OFDM-based broadcasting service can estimate channels through pilots and receive MAC signals. OFDM symbols 121, 122, 123 and 124 are inserted into the remaining fields of the slot, that is, data transmission intervals 101, 105, 106 and 110. The OFDM symbols 121, 122, 123 and 124 are given by modulating BCMCS information.

In the existing HRPD downlink system in which $N_{Data}$=400 chips, a size of the OFDM symbols is set to $N_{Data}$=400 chips. The OFDM scheme arranges a Cyclic Prefix (CP) at the head of each of the OFDM symbols in order to prevent a reception signal time-delayed through multiple paths from causing self interference. That is, one OFDM symbol includes a CP 125 and OFDM data 126 generated by performing Inverse Fast Fourier Transform (IFFT) on BCMCS information. A size of the CP 125 is $N_{CP}$ chips, and for the CP 125, an $N_{CP}$-chip signal is copied at the rear of the OFDM data 126 and then arranged at the head of the OFDM data 126. Therefore, a size of the OFDM data 126 becomes ($N_{Data}$–$N_{CP}$) chips. Herein, $N_{CP}$ is determined depending on an allowed time delay that causes self interference. An increase in the $N_{CP}$ increases the number of delayed reception signals being demodulated without interference but decreases the amount of transmittable information because of a reduction in size of OFDM data. However, a decrease in the $N_{CP}$ increases the amount of transmittable information but reduces reception quality because of a high interference probability in a severe multipath fading environment.

In an SFN, it is common to set a size of the CP to a large value, because the same signals transmitted by several transmitters are received at a terminal at different times. In the HRPD downlink system that transmits OFDM signals for BCMCS service, it is preferable to set $N_{CP}$ to 80 chips ($N_{CP}$=80 chips). In this case, a size of the OFDM data becomes 320 chips. This means that it is possible to perform IFFT on 320 modulation symbols and transmit the IFFT-processed symbols in an OFDM data transmission interval. Therefore, a total of 320 tones can be acquired through the OFDM scheme.

However, not all of the 320 tones can be used for data symbol transmission. Some tones located at the boundaries of a frequency band used should be used as Guard tones for preventing out-band signals from serving as interference. Because the Pilots 103 and 108 used in the existing HRPD downlink are spread with different codes at different transmitters before being transmitted, they are not appropriate to be used for channel estimation for BCMCS service provided in the SFN. Therefore, a dedicated pilot for channel estimation for OFDM signals is additionally required. A signal predefined between a transmitter and a receiver can be transmitted using a part of a tone and then used for channel estimation, and such a tone is called an OFDM-dedicated pilot tone. The OFDM scheme used in the SFN permits a relatively long time delay, resulting in severe frequency-selective fading. Accordingly, there is a need to secure pilot tones sufficient to perform channel estimation even in the severe frequency-selective fading.

FIG. 3 is a diagram illustrating a conventional tone arrangement method in an HRPD system.

Referring to FIG. 3, guard tones 201 are arranged at the boundaries of a band. Of 16 guard tones, 8 guard tones are arranged at a low frequency part of the band and the remaining 8 guard tones are arranged at a high frequency part of the band. No signal is transmitted through the guard tones, so no power is applied to the guard tones. Data tones 203 are arranged in the center of the band. Finally, pilot tones 202 are arranged at regular intervals every five tones because they are used for channel estimation. The tones are arranged in such a manner that four guard tones are followed by a pilot tone arranged at the lowest frequency and then a pilot tone is inserted again.

Similarly, a pilot tone 202 is inserted even in the field where the data tones 203 are arranged, and then four data tones 203 are followed by the pilot tone 202 and a new pilot tone 202 is arranged following the four data tones 203. In this manner, the pilot tones 202 are arranged at a frequency corresponding to a direct current (DC) component. Because the pilot tones 202 are DC tones, they are allocated no power or lower power before being transmitted.

The pilot tones 202 and the data tones 203 are different from each other in terms of the power allocated thereto. An optimal solution for a ratio of power allocated to the pilot tones 202 to power allocated to the data tones 203 should be predefined by a transmitter and a receiver because it differs according to channel conditions.

FIG. 4 is a block diagram illustrating a structure of a conventional transmitter in an HRPD system.

Referring to FIG. 4, a transmitter includes a channel encoder 301 for channel-encoding received packet data, a channel interleaver 302 for interleaving the coded packet data, a modulator 303 for modulating the interleaved packet data, a guard tone inserter 304 for inserting guard tones, and a pilot tone inserter 305 for inserting pilot tones. Further, the transmitter includes a tone power allocator 306, a Quadrature Phase Shift Keying (QPSK) spreader 307, an IFFT unit 308, a CP inserter 309, and an HRPD compatible processor 310.

Physical layer packet data generated in an upper layer is input to the channel encoder 301. The channel encoder 301 channel-encodes the packet data into a channel-coded bit stream, and outputs the channel-coded bit stream to the channel interleaver 302. The channel interleaver 302 interleaves (or performs column permutation on) the channel-coded bit stream to achieve diversity gain, and outputs the interleaved bit stream to the modulator 303. The modulator 303 modulates the interleaved bit stream into a modulation signal. The modulation signal is arranged in data tones 203.

The guard tone inserter 304 arranges the signal output from the modulator 303 in guard tones 201 located in the boundaries of a band, and the pilot tone inserter 305 arranges pilot tones 202 in the signal output from the guard tone inserter 304 at regular intervals. Thereafter, the tone power allocator 306 allocates power according to a ratio R of power allocated to pilot tones to power allocated to data tones. The transmission signal, after being allocated to all tones, is subject to QPSK spreading in the QPSK spreader 307. In the QPSK spreading process, base station signals for transmitting different BCMCS contents are multiplied by different complex Pseudo-random Noise (PN) sequences. The complex PN sequence refers to a complex sequence in which both a real component and an imaginary component include PN codes.

Because an unwanted base station signal may serve as a noise component at a receiver, the receiver can perform channel estimation separately on the channel from the unwanted base station. The complex PN sequence used in the QPSK spreading process is generated according to an input BCMCS contents identifier.

The IFFT unit 308 arranges the QPSK-spread modulation signals in positions of wanted frequency tones through an IFFT process. Thereafter, the CP inserter 309 inserts a CP into the signal output from the IFFT unit 308 so as to prevent self interference due to multipath fading, completing generation of an OFDM transmission signal. Thereafter, the HRPD compatible processor 310 follows an HRPD transmission process to insert Pilots 103 and 108, and MAC information 102, 104, 107 and 109. The finally transmitted signal has a slot format shown in FIG. 2.

With reference to FIGS. 5A and 5B, a description will now be made of a format for transmitting the OFDM BCMCS slot between CDM slots. FIG. 5A is a diagram illustrating a format for transmitting an OFDM BCMCS slot between CDM slots. Herein, the CDM slot has the slot format shown in FIG. 1, and includes a CDM-multiplexed signal in its data field. The OFDM BCMCS slot has the slot format shown in FIG. 2.

With reference to FIG. 5A, a description will now be made of a channel estimation process for each OFDM symbol at a terminal upon receiving an OFDM BCMCS slot 402 transmitted between CDM slots 401 and 403.

The OFDM BCMCS slot 402 includes therein four OFDM symbols 121, 122, 123 and 124. Reference numerals 121 and 124 indicate OFDM symbols located in the boundaries of the slot, and reference numerals 122 and 123 indicate OFDM symbols located in the center of the slot.

Generally, because a length of OFDM symbols is determined such that channels are not subject to change in the OFDM symbols, a channel change between adjacent OFDM symbols may not be significant. Therefore, the OFDM symbols located in the slot center can use pilot tones of the boundary OFDM symbols in order to estimate the channels. For example, not only the pilot tones of the OFDM symbol 122 but also the pilot tones of the OFDM symbols 121 and 123 are used to estimate channels of the OFDM symbol 122, thereby improving channel estimation performance.

However, the OFDM symbols located in the slot boundaries have a limitation in using pilot tones of adjacent OFDM symbols in the channel estimation process. More specifically, pilot tones used to estimate channels of the OFDM symbol 121 include pilot tones of the OFDM symbol 121 and pilot tones of the OFDM symbol 122. This is because there is no pilot tone to be used for channel estimation because a CDM slot other than the BCMCS slot was transmitted before transmission of the OFDM symbol 121. Therefore, the OFDM symbols 122 and 123 located in the center of the OFDM BCMCS slot are superior to the OFDM symbols 121 and 124 located in the slot boundaries in terms of the channel estimation performance. This is because the same value is used for a ratio R of power allocated to the individual pilot tones to power allocated to the individual data tones regardless of the positions of the OFDM symbols.

As a result, compared with the OFDM symbols located in the center of the OFDM BCMCS slot, the OFDM symbols located in the slot boundaries have higher reception error probability occurring during data transmission.

This phenomenon occurs even when OFDM BCMCS slots are continuously transmitted as shown in FIG. 5B. Reference numerals 405, 406 and 407 all represent OFDM BCMCS slots that transmit different broadcasting information. A terminal receiving broadcasting information of the OFDM BCMCS slot 406 is not required to receive the OFDM BCMCS slots 405 and 407. Therefore, even in the situation where OFDM BCMCS slots are continuously transmitted, the reception error probability can differ according to positions of the OFDM symbols.

SUMMARY OF THE INVENTION

It is, therefore, an object of the present invention to provide an apparatus and method for improving reception performance in an HRPD mobile communication system based on an OFDM transmission scheme.

It is another object of the present invention to provide an apparatus and method for adjusting power allocated to pilot tones according to position of an OFDM symbol in an HRPD mobile communication system based on an OFDM transmission scheme.

According to one exemplary aspect of the present invention, there is provided an apparatus for transmitting a packet data symbol in a high-rate packet data (HRPD) mobile communication system for broadcasting service. The apparatus comprises a transmission processor for generating a modulated symbol by encoding, interleaving and modulating a physical layer packet to be transmitted, and arranging the modulated symbol in a data tone; a tone inserter for inserting a guard tone and a pilot tone into the data tone; a tone power allocator for setting a different pilot-to-data tone power ratio according to a position of a slot, in which the packet data symbol is included, and allocating power according to the pilot-to-data tone power ratio; and a transmitter for transmitting the packet data symbol.

According to another exemplary aspect of the present invention, there is provided a method for transmitting a packet data symbol in a high-rate packet data (HRPD) mobile communication system for broadcasting service. The method comprises the steps of: generating a modulated symbol by encoding, interleaving and modulating a physical layer packet to be transmitted, and arranging the modulated symbol in a data tone; inserting a guard tone and a pilot tone into the data tone; setting a different pilot-to-data tone power ratio according to a position of a slot, in which the packet data symbol is included, and allocating power according to the pilot-to-data tone power ratio; and transmitting the packet data symbol.

According to yet another exemplary aspect of the present invention, there is provided a method for receiving a packet data symbol in a high-rate packet data (HRPD) mobile communication system for broadcasting service. The method comprises the steps of: upon receiving information on a pilot-to-data tone power ratio determined according to a position of the packet data symbol, storing a pilot-to-data tone power ratio according to the symbol position; if the received packet is an orthogonal frequency division multiplexing (OFDM) packet, extracting a data symbol from the OFDM packet and despreading the extracted data symbol, thereby extracting a data tone and a pilot tone; estimating a channel using a pilot-to-data tone power ratio of the OFDM packet; and restoring data from the data tone using the channel estimation information.

According to still another exemplary aspect of the present invention, there is provided an apparatus for receiving a packet data symbol in a high-rate packet data (HRPD) mobile communication system for broadcasting service. The apparatus comprises a channel estimation unit for receiving a control message, extracting a pilot-to-data tone power ratio according to a position of the packet data symbol, determining a channel estimation weight, and estimating a channel according to a pilot-to-data tone power ratio; an orthogonal frequency division multiplexing (OFDM) processor for dividing a received OFDM symbol into a pilot tone and a data tone, providing the pilot tone to the channel estimation unit, and outputting the data tone; and a data restoration unit for restoring transmitted information from the data tone using the channel estimation information provided from the channel estimation unit.

BRIEF DESCRIPTION OF THE DRAWINGS

The above and other exemplary objects, features and advantages of the present invention will become more apparent from the following detailed description when taken in conjunction with the accompanying drawings in which like reference numerals will be understood to refer to like parts, components and structures, where:

FIG. 1 is a diagram illustrating a slot format of a downlink in a conventional HRPD mobile communication system;

FIG. 2 is a diagram illustrating a slot format provided by inserting an OFDM symbol into a data transmission interval of an HRPD downlink slot for BCMCS service;

FIG. 3 is a diagram illustrating a conventional tone arrangement method in an HRPD system;

FIG. 4 is a block diagram illustrating a structure of a conventional transmitter in an HRPD system;

FIG. 5A is a diagram illustrating a format for transmitting an OFDM BCMCS slot between CDM slots;

FIG. 5B is a diagram illustrating a format for transmitting an OFDM BCMCS slot between OFDM BCMCS slots;

DETAILED DESCRIPTION OF EXEMPLARY EMBODIMENTS

Figure 6:
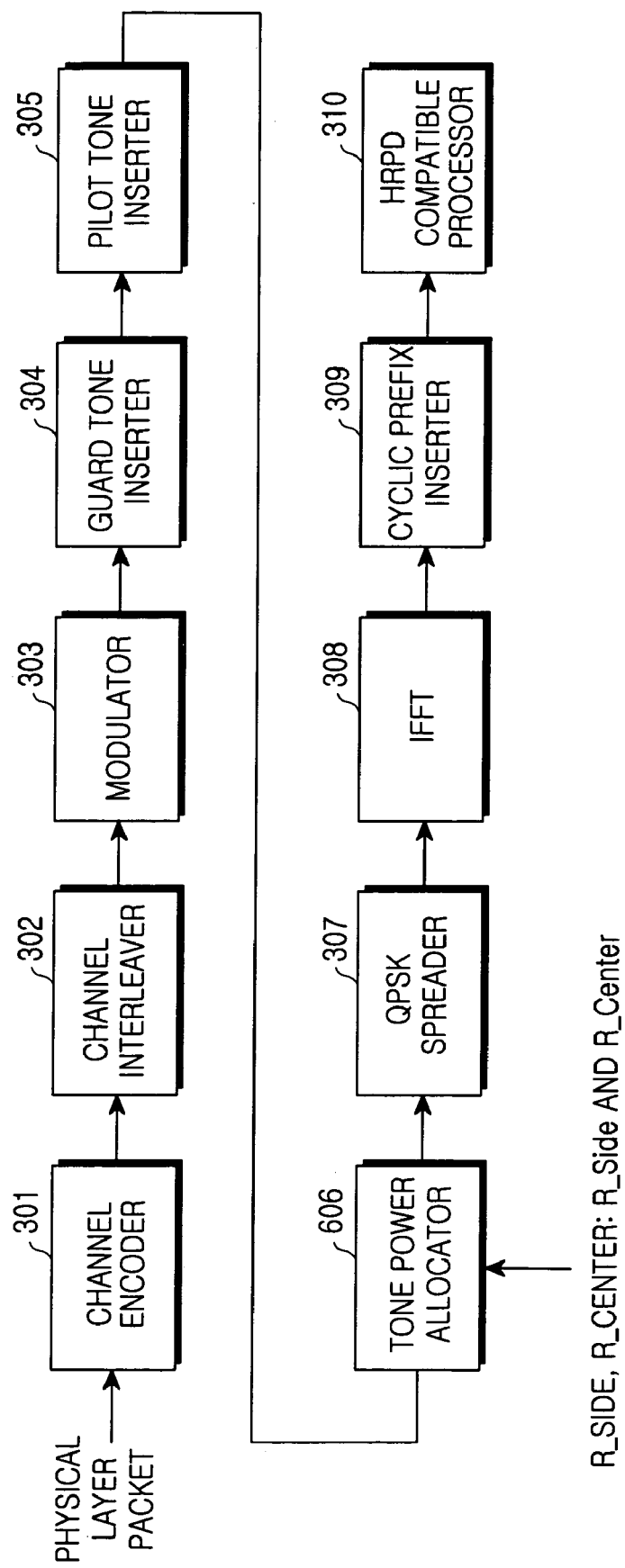
FIG. 6 is a block diagram illustrating a structure of a transmitter in an HRPD system for broadcasting service according to an exemplary embodiment of the present invention.

Several exemplary embodiments of the present invention will now be described in detail with reference to the annexed drawings. In the drawings, as noted above, the same or similar elements are denoted by the same reference numerals even though they are depicted in different drawings. In the following description, a detailed description of known functions and configurations incorporated herein has been omitted for clarity and conciseness.

In a system using an OFDM transmission scheme compatible with HRPD, BCMCS slots may not be continuously transmitted. Therefore, channel estimation performance depends on whether OFDM symbols are located in slot boundaries or slot center. The OFDM symbols located in the slot boundaries are inferior to the OFDM symbols located in the slot center in terms of channel estimation performance. That is, because the same value is used for a ratio R of power allocated to individual pilot tones to power allocated to individual data tones regardless of the positions of the OFDM symbols, error probability of the OFDM symbols located in the slot boundaries increases.

Therefore, an exemplary embodiment of the present invention provides a method for adjusting power allocated to pilot tones according to position of a slot, thereby improving reception capability.

In general, an increase in power of pilot tones improves channel estimation performance. However, because the total transmission power used as pilot tone power and data tone power is limited, an increase in power for pilot tones causes a decrease in power for data tones. The decrease in power for data tones leads to an increase in error probability in a data decoding process. Therefore, for the given total transmission power, there is a need for a tradeoff between power to be allocated to pilot tones and power to be allocated to data tones.

In operation, a power ratio R_Side to be used at OFDM symbols located in the slot boundaries and a power ratio R_Center to be used at OFDM symbols located in the slot center should be predefined in a transmission/reception interval. For the power ratios R_Side and R_Center, a terminal can use either their initial values or the values notified from a base station before receipt of a BCMCS slot. That is, because the optimal R_Side and R_Center values differ according to channel conditions, these values are predefined in the transmission/reception period. In a fast fading environment, it is preferable to set R_Side and R_Center to higher possible values because channel estimation performed using pilot tones in another symbol may show low reliability.

FIG. 6 is a block diagram illustrating a structure of a transmitter in an HRPD system for broadcasting service according to an exemplary embodiment of the present invention.

The transmitter includes a channel encoder 301 for channel-encoding received packet data, a channel interleaver 302 for interleaving the coded packet data, a modulator 303 for modulating the interleaved packet data, a guard tone inserter 304 for inserting guard tones in the signal output from the modulator 303, and a pilot tone inserter 305 for inserting pilot tones in the signal output from the guard tone inserter 304. Further, the transmitter includes a tone power allocator 606, a QPSK spreader 307, an IFFT unit 308, a CP inserter 309, and an HRPD compatible processor 310.

An operation of the transmitter will now be described in detail with reference to FIG. 6.

Physical layer packet data generated in an upper layer is input to the channel encoder 301. The channel encoder 301 channel-encodes the packet data into a channel-coded bit stream, and outputs the channel-coded bit stream to the channel interleaver 302. The channel interleaver 302 interleaves (or performs column permutation on) the channel-coded bit stream to achieve diversity gain, and outputs the interleaved bit stream to the modulator 303. The modulator 303 modulates the interleaved bit stream into a modulation signal. The modulation signal is arranged in data tones 203.

The guard tone inserter 304 arranges the signal output from the modulator 303 in guard tones 201 located in the boundaries of a band, and the pilot tone inserter 305 arranges pilot tones 202 in the signal output from the guard tone inserter 304 at regular intervals.

Thereafter, the tone power allocator 606 adjusts power allocated to pilot tones depending on position of corresponding symbols, that is, whether corresponding OFDM symbols are located in the slot boundaries or slot center, This will be described in more detail with reference to FIG. 5A. For the OFDM symbols 121 and 124 located in the slot boundaries, power for pilot tones and data tones are allocated using a power ratio R_Side. For the OFDM symbols 122 and 123 located in the slot center, power for pilot tones and data tones are allocated using a power ratio R_Center. As described above, in an exemplary implementation the R_Side and R_Center values are predefined.

The transmission signal, after allocated to all tones, is subject to QPSK spreading in the QPSK spreader 307. The IFFT unit 308 arranges the QPSK-spread modulation signals in positions of wanted frequency tones through an IFFT process. Thereafter, the CP inserter 309 inserts a CP into the signal output from the IFFT unit 308, completing generation of an OFDM transmission signal.

An exemplary embodiment of the present invention sets a variable pilot-to-data tone power ratio (that is, a variable ratio of pilot tone power to data tone power) according to position of OFDM symbols. Alternatively, however, it is also possible to set a fixed power ratio for a particular position of an OFDM symbol. According to an exemplary implementation of the present invention, the HRPD system uses the variable power ratio rather than the fixed power ratio because OFDM symbols may not be transmitted at all slots.

In order to use the variable power ratio rather than the fixed power ratio, a base station transmits information on a power ratio based on a position of an OFDM symbol to a terminal using a signaling message (for example, BroadcastOverhead message) used to support BCMCS service in the HRPD system, to inform the terminal of the current pilot-to-data tone power ratio.

To variably set the pilot-to-data tone power ratio, the following two exemplary embodiments can be taken into consideration.

In a first embodiment, a base station provides a terminal with information indicating a pilot-to-data tone power ratio, commonly applied at a slot where OFDM symbols are transmitted. A format of a signaling message used by the base station to inform the terminal of the common power ratio in the first embodiment is shown in Table 1.

TABLE 1

| Field | Length (bits) |
|---|---|
| [...] | [...] |
| DualPDREnabled | 1 |
| EBCMCSTransmissionFormat | 0 or N |
| DCPilotToDataGain | 0 or N |
| DualPDREnabledForThisLogicalChannel | 1 |
| ACPilotToDataGainRecord | 0, N, 2N, or 4N |
| [...] | [...] |

Table 1 illustrates only those fields used in an exemplary embodiment of the present invention, and omits therefrom other fields used for supporting BCMCS service. The signaling message shown in Table 1 is configured to indicate a pilot-to-data tone power ratio for two types of symbols. The HRPD system, on the assumption that four OFDM symbols are transmitted over one slot, can indicate a pilot-to-data tone power ratio for each of the OFDM symbols. However, because the two symbols located in the slot center are similar in characteristic to the two symbols located in the slot boundaries, the pilot-to-data tone power ratio is indicated such that a load of the signaling message can be reduced. Each field of the signaling message shown in Table 1 will now be described below.

A 'DualPDREnabled' field indicates whether a ratio of pilot tone power to data tone power (Dual Pilot-to-Data tone power Ratio (Dual PDR)) for the two types of symbols is used or not. If this field value is set to '1', it means that the Dual PDR is used. However, if this field value is set to '0', it means that only the pilot-to-data tone power ratio for one type of symbols is used.

An 'EBCMCSTransmissionFormat' field indicates a transmission formation. If the most significant bit (MSB) of this field is set to '0', it means that a transmission format not supporting a variable format is used. However, if the MSB of this field is set to '1', it means that a transmission format supporting a variable format is used. The variable format, when transmitting multiple slots, permits each individual slot to transmit OFDM symbols in other formats. According to an exemplary implementation of the present invention, a format of OFDM symbols for the variable format is defined with a size of a CP, the number of pilot tones, and the number of guard tones. That is, in supporting the variable format, it is possible to transmit OFDM symbols to which a CP, pilot tones and guard tones, all of which have different sizes (or length), are applied, for each individual slot. Therefore, the individual slots may differ in appropriate PDR value. When supporting the variable format for this reason, it is necessary to set a different PDR value before and after a change in the format.

A 'DCPilotToDataGain' field indicates a ratio of DC pilot tone power to data tone power (that is, a DC pilot-to-data tone power ratio). In the first exemplary embodiment of the present invention, because it is assumed that a Dual PDR is applied only to alternating current (AC) pilot tones, a single DCPilotToDataGain value is defined.

A 'DualPDREnabledForThisLogicalChannel' field indicates whether a corresponding logical channel includes a Dual PDR. If this field value is set to '1', the corresponding logical channel uses a Dual PDR, indicating that a field related to the Dual PDR will be defined through this field. However, if this field value is set to '0', it means that the corresponding logical channel does not use the Dual PDR.

An 'ACPilotToDataGainRecord' field indicates a ratio of AC pilot tone power to data tone power (that is, an AC pilot-to-data tone power ratio). If the 'DualPDREnabledForThisLogicalChannel' field is set to '0', indicating that the Dual PDR is not used, the 'ACPilotToDataGainRecord' field is expressed in the format shown in Table 2A or Table 2B.

TABLE 2A

| Field | Length (bits) |
|---|---|
| ACPilotToDataGain | N |

TABLE 2B

| Field | Length (bits) |
|---|---|
| ACPilotToDataGain1 | N |
| ACPilotToDataGain2 | N |

Table 2A illustrates an AC pilot-to-data tone power ratio for the case where the variable format is not used, and Table 2B illustrates an AC pilot-to-data tone power ratio for the case where the variable format is used.

Table 2A illustrates how to express the 'ACPilotToDataGainRecord' field when the 'DualPDREnabledForThisLogicalChannel' field is set to '0' and an MSB in the 'EBCMCSTransmissionFormat' field is set to '0', that is, the Dual PDR and the variable format are not used. An 'ACPilotToDataGain' field indicates an AC pilot-to-data tone power ratio, and is defined in the same value regardless of a position of the corresponding symbol.

Table 2B illustrates how to express the 'ACPilotToDataGainRecord' field when the 'DualPDREnabledForThisLogicalChannel' field is set to '0' and an MSB in the 'EBCMCSTransmissionFormat' field is set to '1', that is, the Dual PDR is not used and the variable format is used. An 'ACPilotToDataGain1' field indicates an AC pilot-to-data tone power ratio before a change in transmission format, and an 'ACPilotToDataGain2' field indicates an AC pilot-to-data tone power ratio after the change in the transmission format, and is defined in the same value regardless of a position of the corresponding symbol.

If the 'DualPDREnabledForThisLogicalChannel' field is set to '1', indicating the Dual PDR is used, the 'ACPilotToDataGainRecord' field is expressed in the format shown in Table 2C or Table 2D.

TABLE 2C

| Field | Length (bits) |
|---|---|
| ACInternalPilotToDataGain | N |
| ACBoundaryPilotToDataGain | N |

TABLE 2D

| Field | Length (bits) |
|---|---|
| ACInternalPilotToDataGain1 | N |
| ACBoundayPilotToDataGain1 | N |
| ACInternalPilotToDataGain2 | N |
| ACBoundayPilotToDataGain2 | N |

Table 2C illustrates an AC pilot-to-data tone power ratio for the case where the variable format is not used, and Table 2D illustrates an AC pilot-to-data tone power ratio for the case where the variable format is used.

Table 2C illustrates how to express the 'ACPilotToData-GainRecord' field when the 'DualPDREnabledForThisLogicalChannel' field is set to '1' and an MSB in the 'EBCMC-STransmissionFormat' field is set to '0', that is, the Dual PDR is used and the variable format is not used. An 'ACInternalPilotToDataGain' field includes a pilot-to-data tone power ratio value used for transmission of center symbols among the OFDM symbols transmitted over one slot, and an 'ACBoundaryPilotToDataGain' field includes a pilot-to-data tone power ratio value used for transmission of boundary symbols among the OFDM symbols transmitted over one slot.

Table 2D illustrates how to express the 'ACPilotToData-GainRecord' field when the 'DualPDREnabledForThisLogicalChannel' field is set to '1' and an MSB in the 'EBCMC-STransmissionFormat' field is set to '1', that is, both the Dual PDR and the variable format are used. An 'ACInternalPilotToDataGain1' field and an 'ACBoundaryPilotToDataGain1' field include a pilot-to-data tone power ratio value used for transmission of center symbols among the OFDM symbols transmitted over one slot, and a pilot-to-data tone power ratio value used for transmission of boundary symbols among the OFDM symbols transmitted over one slot, respectively, and are used before a change of the transmission format.

An 'ACInternalPilotToDataGain2' field and an 'ACBoundaryPilotToDataGain2' field include a pilot-to-data tone power ratio value used for transmission of center symbols among the OFDM symbols transmitted over one slot, and a pilot-to-data tone power ratio value used for transmission of boundary symbols among the OFDM symbols transmitted over one slot, respectively, and are used after a change of the transmission format.

In a second exemplary embodiment, a base station provides a terminal with information indicating a pilot-to-data tone power ratio, applied at a slot where OFDM symbols are transmitted, for each individual interlace. The HRPD system, operating in a 4-slot interlace transmission scheme, can use only one or more interlaces for OFDM symbol transmission. Therefore, during OFDM symbol transmission, the HRPD system can set a different pilot-to-data tone power ratio value for each individual interlace.

A format of a signaling message used by the base station to inform the terminal of the variable pilot-to-data tone power ratio for each individual interlace during OFDM symbol transmission in the second embodiment is shown in Table 3.

TABLE 3

| Field | Length (bits) |
|---|---|
| [...] | [...] |
| PilotToneToDataTonePowerRatioIncluded | 1 |
| [...] | [...] |
| Interlace0Included | 1 |
| CenterSymbolsPTDTPR0 | 0 or N |
| SideSymbolsPTDTPR0 | 0 or N |
| [...] | [...] |
| Interlace1Included | 1 |
| CenterSymbolsPTDTPR1 | 0 or N |
| SideSymbolsPTDTPR1 | 0 or N |
| [...] | [...] |
| Interlace2Included | 1 |
| CenterSymbolsPTDTPR2 | 0 or N |
| SideSymbolsPTDTPR2 | 0 or N |
| [...] | [...] |
| Interlace3Included | 1 |
| CenterSymbolsPTDTPR3 | 0 or N |
| SideSymbolsPTDTPR3 | 0 or N |
| [...] | [...] |

Table 3 illustrates only the fields used for an embodiment of the present invention, and omits therefrom other fields used for supporting BCMCS service. The signaling message shown in Table 3 is configured to include a field indicating a pilot-to-data tone power ratio for two types of symbols.

The signaling message can include a field for indicating a pilot-to-data tone power ratio for each symbol. However, the signaling message includes a field for indicating a pilot-to-data tone power ratio for two types of symbols as shown in Table 3, in order to reduce a load of the signaling message.

Each field of the signaling message shown in Table 3 will now be described in detail below.

A 'PilotToneToDataTonePowerRatioIncluded' field indicates whether a pilot-to-data tone power ratio value is included or not. If this field value is set to '0', it means that a pilot-to-data tone power ratio is not included and a default value is used. However, if this field value is set to '1', it means that a pilot-to-data tone power ratio, used during transmission of all OFDM symbols, is included.

An 'InterlaceXIncluded' field indicates whether information to be transmitted using interlaced-'X' slots is included or not. Herein, X denotes 0, 1, 2 or 3. If this field value is set to '0', it means that the transmission information is not included, and if this field value is set to '1', it means that the transmission information is included.

A 'CenterSymbolsPTDTPRX (Pilot Tone to Data Tone Power Ratio for Center Symbols transmitted in interlace X slots, for X=0, 1, 2, or 3)' field includes a pilot-to-data tone power ratio value used for transmission of center symbols among the OFDM symbols transmitted over one slot included in an interlace X. The 'CenterSymbolsPTDTPRX' field is included only when the 'PilotToneToDataTonePowerRatioIncluded' field is set to '1' and the 'InterlaceXIncluded' field is set to '1'.

A 'SideSymbolsPTDTPRX (Pilot Tone to Data Tone Power Ratio for Side Symbols transmitted in interlace X slots, for X=0, 1, 2, or 3)' field indicates a pilot-to-data tone power ratio value used for transmission of boundary symbols among the OFDM symbols transmitted over one slot included in an interlace X. The 'SideSymbolsPTDTPRX' field is included only when the 'PilotToneToDataTonePowerRatioIncluded' field is set to '1' and the 'InterlaceXIncluded' field is set to '1'.

N shown in Table 1 through Table 3 is used to indicate a pilot-to-data tone power ratio value. This value can be expressed in dB or can be coded before being transmitted, and its resolution can depend on a size of the N.

Figure 7:
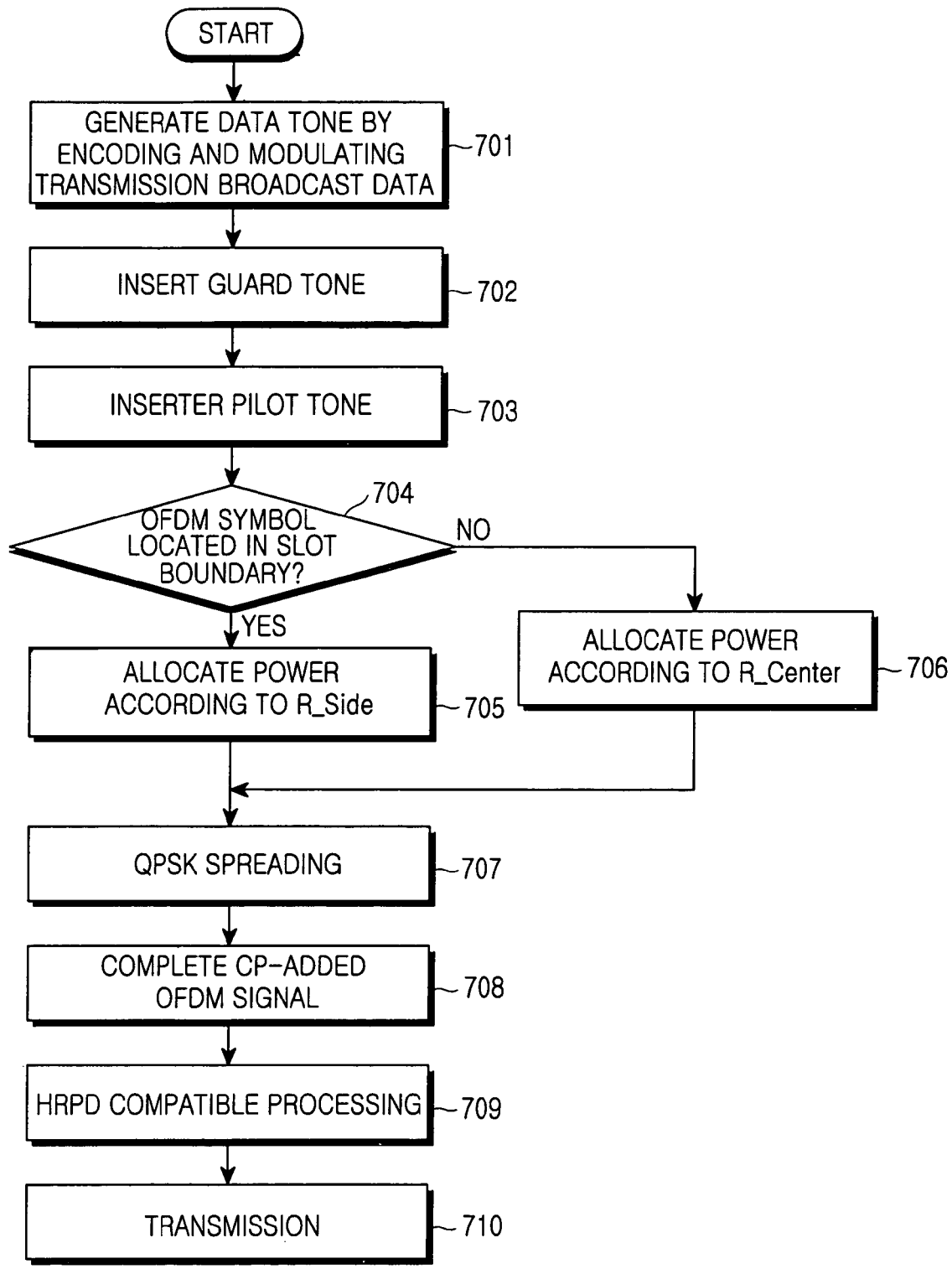
FIG. 7 is a flowchart illustrating an operation of a transmitter in an HRPD system for broadcasting service according to an exemplary embodiment of the present invention.

With reference to FIG. 7, a detailed description will now be made of an operation of the transmitter for setting a different pilot-to-data tone power ratio value for a transmission slot according to position of OFDM symbols so that a fixed power ratio value can always be used at a position of a particular OFDM symbol, according to an exemplary embodiment of the present invention.

FIG. 7 is a flowchart illustrating an operation of a transmitter in an HRPD system for broadcasting service according to an exemplary embodiment of the present invention. In an exemplary embodiment of the present invention, a transmitter in an HRPD system for broadcasting service refers to a base station.

In step 701, a transmitter generates data tones from broadcasting data to be transmitted, using a channel encoder 301, a channel interleaver 302 and a modulator 303. The transmitter inserts guard tones into the data tones in step 702, and inserts pilot tones into the guard tone-inserted data tones in step 703. The transmitter determines in step 704 whether a corresponding OFDM symbol is located in the center of a slot or the boundary of the slot. If it is determined that the OFDM symbol is located in the slot boundary, the transmitter allocates power to the pilot tones and the data tones according to a power ratio R_Side in step 705. However, if it is determined that the OFDM symbol is located in the slot center, the transmitter allocates power to the pilot tones and the data tones according to a power ratio R_Center in step 706.

Thereafter, in step 707, the transmitter performs different QPSK spreading according to BCMCS contents identifier, using a QPSK spreader 307. In step 708, the transmitter performs an IFFT process using an IFFT unit 308, and inserts a CP into the IFFT-processed symbol using a CP inserter 309, completing an OFDM signal. Thereafter, the transmitter performs an HRPD compatible process using an HRPD compatible processor 310 in step 709, and transmits the completed OFDM signal in step 710.

Figure 8:
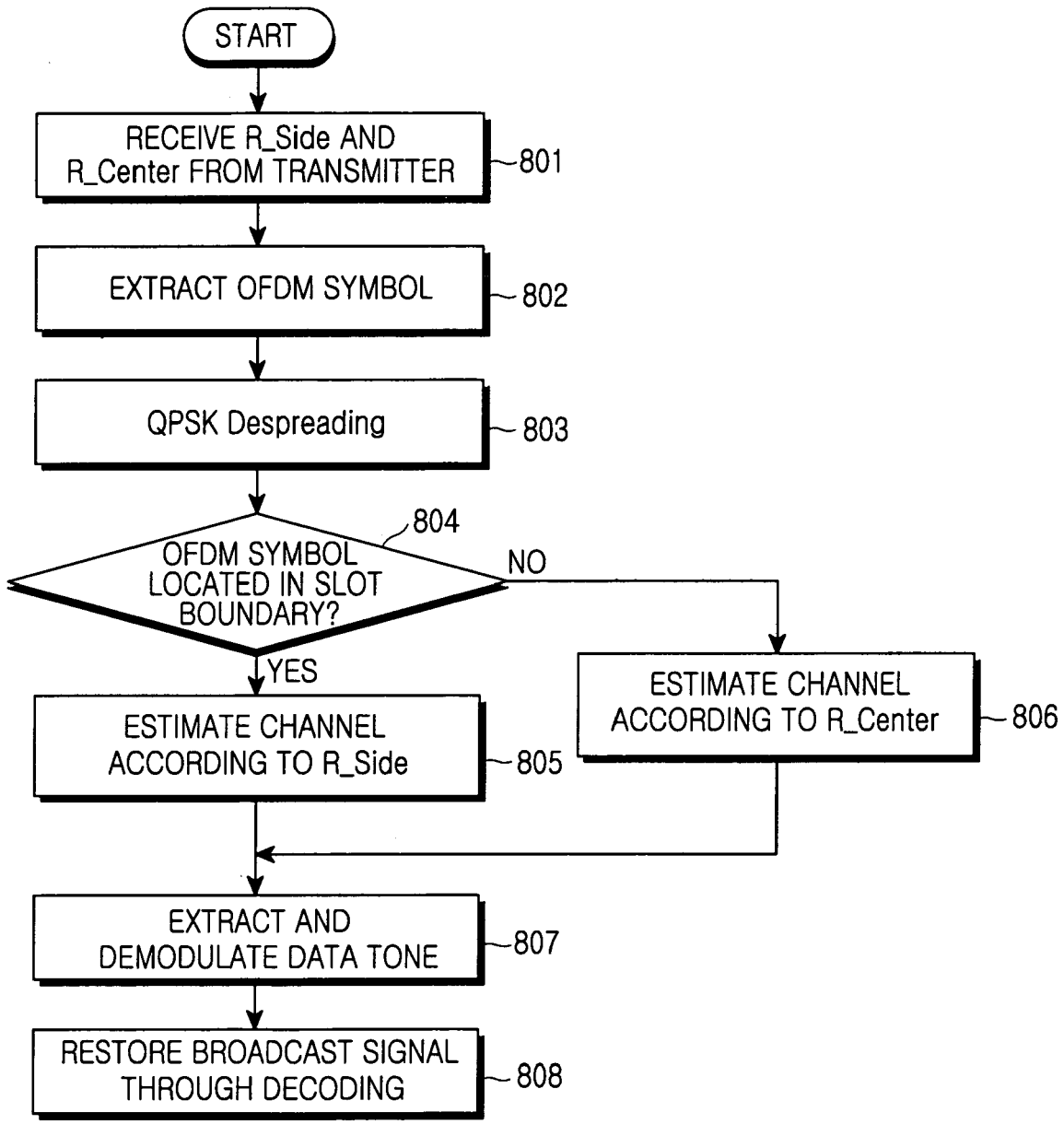
FIG. 8 is a flowchart illustrating an operation of a receiver in an HRPD system for broadcasting service according to an exemplary embodiment of the present invention.

With reference to FIG. 8, a description will now be made of an exemplary process of restoring a broadcasting signal at a receiver upon receiving the OFDM signal generated through the operation of FIG. 7.

FIG. 8 is a flowchart illustrating an operation of a receiver in an HRPD system for broadcasting service according to an exemplary embodiment of the present invention. In an exemplary embodiment of the present invention, a receiver in an HRPD system for broadcasting service refers to a terminal.

In step 801, a receiver receives R_Side and R_Center values from a base station, or a transmitter. Upon failure to receive the R_Side and R_Center values, the receiver uses initial R_Side and R_Center values. Upon receiving a BCMCS slot, the receiver extracts an OFDM symbol from the received BCMCS slot in step 802, and performs QPSK despreading on the extracted OFDM symbol in step 803.

Thereafter, in step 804, the receiver performs channel estimation and determines whether the OFDM symbol is located in a slot boundary. If the received OFDM symbol is located in the slot boundary, the receiver proceeds to step 805 where it performs channel estimation according to a pilot-to-data tone power ratio R_Side.

However, if the received OFDM symbol is located in the slot center, the receiver proceeds to step 806 where it performs channel estimation according to a pilot-to-data tone power ratio R_Center. In the channel estimation processes of steps 805 and 806, the receiver uses pilot tones located in adjacent OFDM symbols. In step 807, the receiver extracts data tones from the estimated channel and demodulates the extracted data tones. In step 808, the receiver finally decodes the demodulated data tones into the broadcasting signal transmitted from the transmitter.

It was assumed in FIGS. 7 and 8 that there were four OFDM symbols in one slot. However, the foregoing methods can be applied in the same way even though the number of OFDM symbols is changed. In this case, a pilot-to-data tone power ratio for the OFDM symbols located in the boundaries of a slot can be set to R_Side, and a pilot-to-data tone power ratio for the remaining OFDM symbol(s) located in the center of the slot can be set to R_Center.

Another exemplary embodiment of the present invention will now be described in brief below. In the exemplary embodiments described with reference to FIGS. 5 through 8, it is assumed that one OFDM BCMCS slot has at least one CDM slot being adjacent thereto. However, when an OFDM slot has one CDM slot being adjacent thereto, a pilot-to-data tone power ratio only for the OFDM symbols located in the OFDM slot being immediately adjacent to the CDM slot can be set to R_Side.

Figure 9:
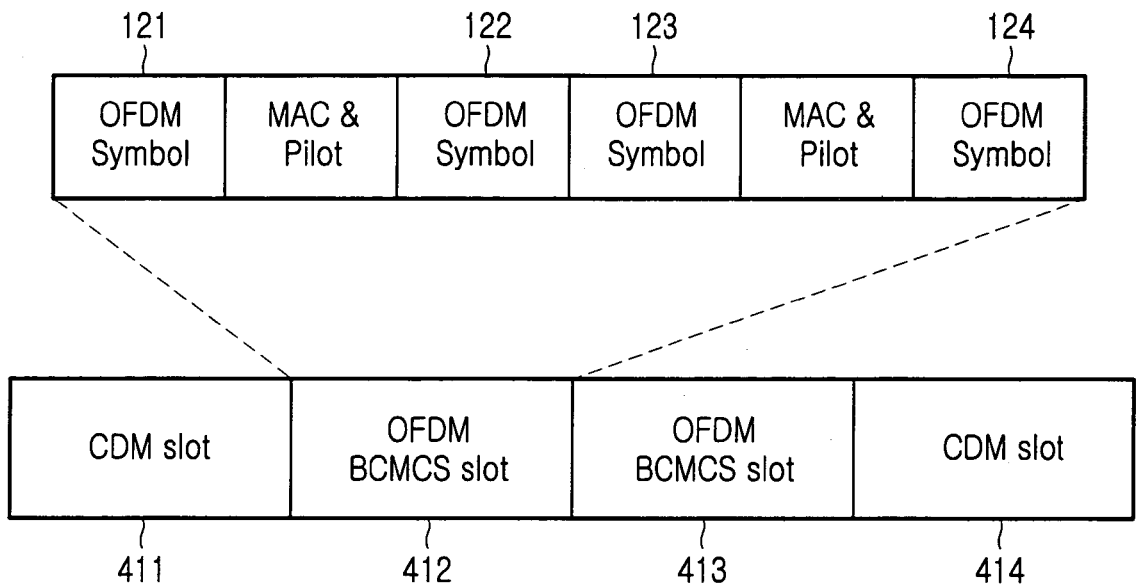
FIG. 9 is a diagram illustrating an exemplary slot format for consecutively transmitting OFDM BCMCS slots between CDM slots.

FIG. 9 is a diagram illustrating an exemplary slot format for consecutively transmitting OFDM BCMCS slots. Reference numerals 412 and 413 represent OFDM BCMCS slots for transmitting the same broadcasting information, and a receiver receives both the OFDM BCMCS slots 412 and 413. However, a BCMCS receiver does not receive CDM slots 411 and 414. In this situation, the BCMCS receiver can use OFDM symbols of the OFDM BCMCS slot 413 in a channel estimation process for demodulating an OFDM symbol 124. In an exemplary implementation of the present invention, the OFDM symbols 121 and 124, although they are both located in the slot boundaries, should be allocated power according to different pilot-to-data tone power ratios.

In order to address a possible problem in this situation, an exemplary embodiment of the present invention can provide an extended method for setting different pilot-to-data tone power ratios for the individual positions of OFDM symbols in the slot.

A format of a signaling message used for indicating the power ratio is illustrated in Table 4.

TABLE 4

| Field | Length (bits) |
| --- | --- |
| [...] | [...] |
| PilotToneToDataTonePowerRatioIncluded | 1 |
| [...] | [...] |
| Interlace0Included | 1 |
| FirstSymbolsPTDTPR0 | 0 or N |
| SecondSymbolsPTDTPR0 | 0 or N |
| ThirdSymbolsPTDTPR0 | 0 or N |
| FourthSymbolsPTDTPR0 | 0 or N |
| [...] | [...] |
| Interlace1Included | 1 |
| FirstSymbolsPTDTPR1 | 0 or N |
| SecondSymbolsPTDTPR1 | 0 or N |
| ThirdSymbolsPTDTPR1 | 0 or N |
| FourthSymbolsPTDTPR1 | 0 or N |
| [...] | [...] |
| Interlace2Included | 1 |
| FirstSymbolsPTDTPR2 | 0 or N |
| SecondSymbolsPTDTPR2 | 0 or N |
| ThirdSymbolsPTDTPR2 | 0 or N |
| FourthSymbolsPTDTPR2 | 0 or N |
| [...] | [...] |
| Interlace3Included | 1 |
| FirstSymbolsPTDTPR3 | 0 or N |
| SecondSymbolsPTDTPR3 | 0 or N |
| ThirdSymbolsPTDTPR3 | 0 or N |
| FourthSymbolsPTDTPR3 | 0 or N |
| [...] | [...] |

Table 4 illustrates only the fields used for an exemplary embodiment of the present invention, and omits therefrom other fields used for supporting BCMCS service. Each field of the signaling message shown in Table 4 will now be described in detail below.

A 'PilotToneToDataTonePowerRatioIncluded' field indicates whether a pilot-to-data tone power ratio value is included or not. If this field value is set to '0', it means that a pilot-to-data tone power ratio is not included and an initially-set default value is used. However, if this field value is set to '1', it means that a pilot-to-data tone power ratio, used during transmission of all OFDM symbols, is included.

An 'InterlaceXIncluded' field indicates whether information to be transmitted using interlaced-'X' slots is included or not. Herein, X denotes 0, 1, 2 or 3. If this field value is set to '0', it means that the transmission information is not included, and if this field value is set to '1', it means that the transmission information is included.

A 'FirstSymbolsPTDTPRX (Pilot Tone to Data Tone Power Ratio for the First Symbols transmitted in interlace X slots, for X=0, 1, 2, or 3)' field includes a pilot-to-data tone power ratio value used for transmission of the first symbols in a corresponding slot, like an OFDM symbol 121 of FIG. 9, among the OFDM symbols transmitted over one slot. The 'FirstSymbolsPTDTPRX' field is included only when the 'PilotToneToDataTonePowerRatioIncluded' field is set to '1' and the 'InterlaceXIncluded' field is set to '1'.

A 'SecondSymbolsPTDTPRX (Pilot Tone to Data Tone Power Ratio for the Second Symbols transmitted in interlace X slots, for X=0, 1, 2, or 3)' field includes a pilot-to-data tone power ratio value used for transmission of the second symbols in a corresponding slot, like an OFDM symbol 122 of FIG. 9, among the OFDM symbols transmitted over one slot. The 'SecondSymbolsPTDTPRX' field is included only when the 'PilotToneToDataTonePowerRatioIncluded' field is set to '1' and the 'InterlaceXIncluded' field is set to '1'.

A 'ThirdSymbolsPTDTPRX (Pilot Tone to Data Tone Power Ratio for the Third Symbols transmitted in interlace X slots, for X=0, 1, 2, or 3)' field includes a pilot-to-data tone power ratio value used for transmission of the third symbols in a corresponding slot, like an OFDM symbol 123 of FIG. 9, among the OFDM symbols transmitted over one slot. The 'ThirdSymbolsPTDTPRX' field is included only when the 'PilotToneToDataTonePowerRatioIncluded' field is set to '1' and the 'InterlaceXIncluded' field is set to '1'.

A 'FourthSymbolsPTDTPRX (Pilot Tone to Data Tone Power Ratio for the Fourth Symbols transmitted in interlace X slots, for X=0, 1, 2, or 3)' field includes a pilot-to-data tone power ratio value used for transmission of the fourth symbols in a corresponding slot, like an OFDM symbol 124 of FIG. 9, among the OFDM symbols transmitted over one slot. The 'FourthSymbolsPTDTPRX' field is included only when the 'PilotToneToDataTonePowerRatioIncluded' field is set to '1' and the 'InterlaceXIncluded' field is set to '1'.

Figure 10:
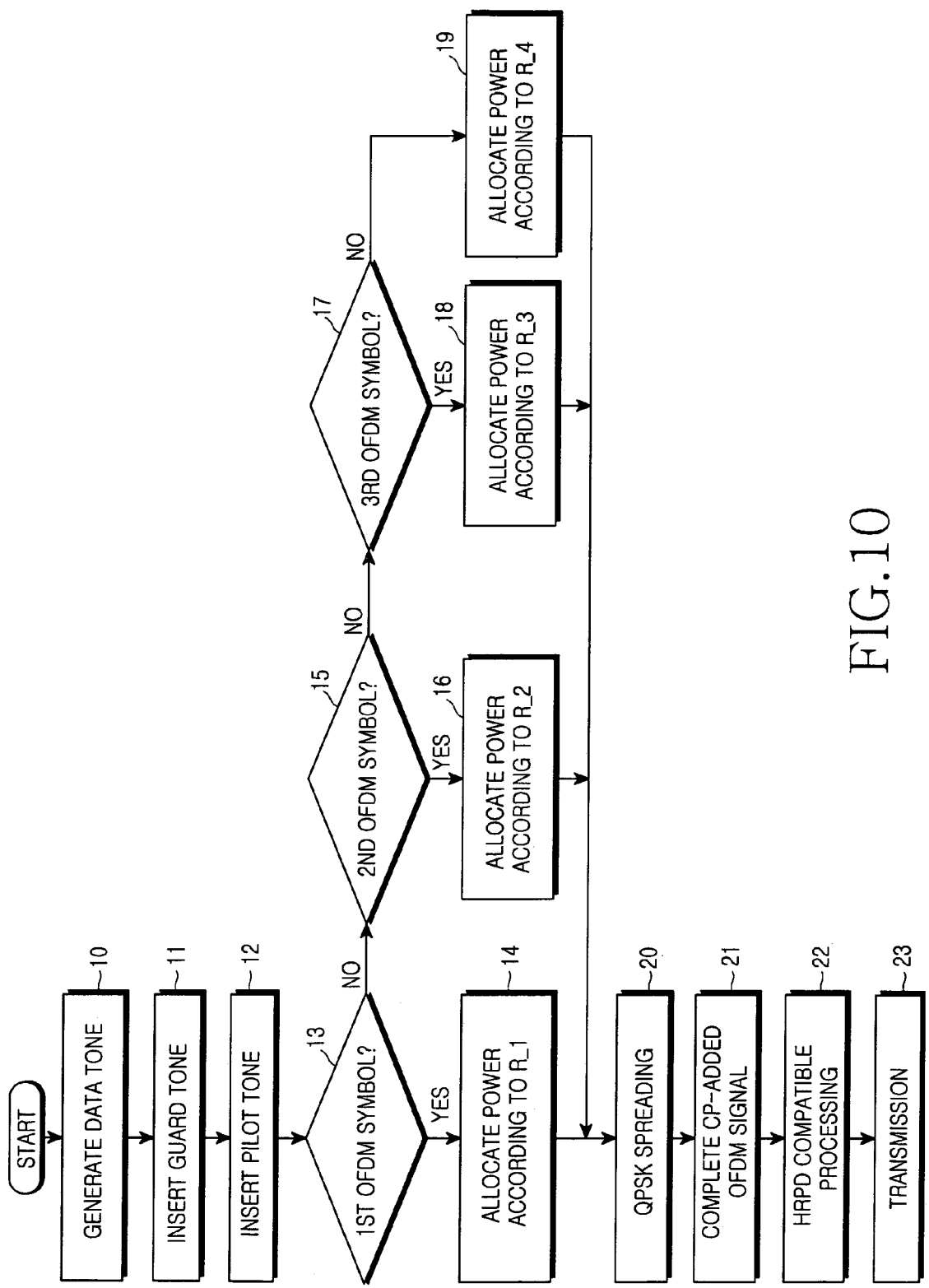
FIG. 10 is a flowchart illustrating an operation of a transmitter in an HRPD system for broadcasting service according to another exemplary embodiment of the present invention.

FIG. 10 is a flowchart illustrating an operation of a transmitter in an HRPD system for broadcasting service according to another exemplary embodiment of the present invention in which the transmitter uses different pilot-to-data tone power ratios for individual positions of OFDM symbols. In an exemplary embodiment of the present invention, a transmitter in an HRPD system for broadcasting service refers to a base station.

In step 10, a transmitter generates data tones from broadcasting data to be transmitted, using a channel encoder 301, a channel interleaver 302 and a modulator 303. The transmitter inserts guard tones into the data tones in step 11, and inserts pilot tones into the guard tone-inserted data tones in step 12.

The transmitter determines in step 13 whether a corresponding OFDM symbol is located in the first position of the slot. If the OFDM symbol is a first OFDM symbol of the slot, the transmitter allocates power to the pilot tones and the data tones according to a power ratio R_1 in step 14. Otherwise, the transmitter determines in step 15 whether the OFDM symbols is located in the second position of the slot. If the OFDM symbol is a second OFDM symbol of the slot, the transmitter allocates power to the pilot tones and the data tones according to a power ratio R_2 in step 16. Otherwise, the transmitter determines in step 17 whether the OFDM symbols is located in the third position of the slot. If the OFDM symbol is a third OFDM symbol of the slot, the transmitter allocates power to the pilot tones and the data tones according to a power ratio R_3 in step 18. Otherwise, because it indicates that the OFDM symbol is located in the last position of the slot, the transmitter allocates power to the pilot tones and the data tones according to a power ratio R_4 in step 19.

Thereafter, in step 20, the transmitter performs different QPSK spreading according to BCMCS contents identifier, using a QPSK spreader 307. In step 21, the transmitter performs an IFFT process using an IFFT unit 308, and inserts a CP into the IFFT-processed symbol using a CP inserter 309, completing an OFDM signal. Thereafter, the transmitter performs an HRPD compatible process using an HRPD compatible processor 310 in step 22, and transmits the completed OFDM signal in step 23.

Figure 11:
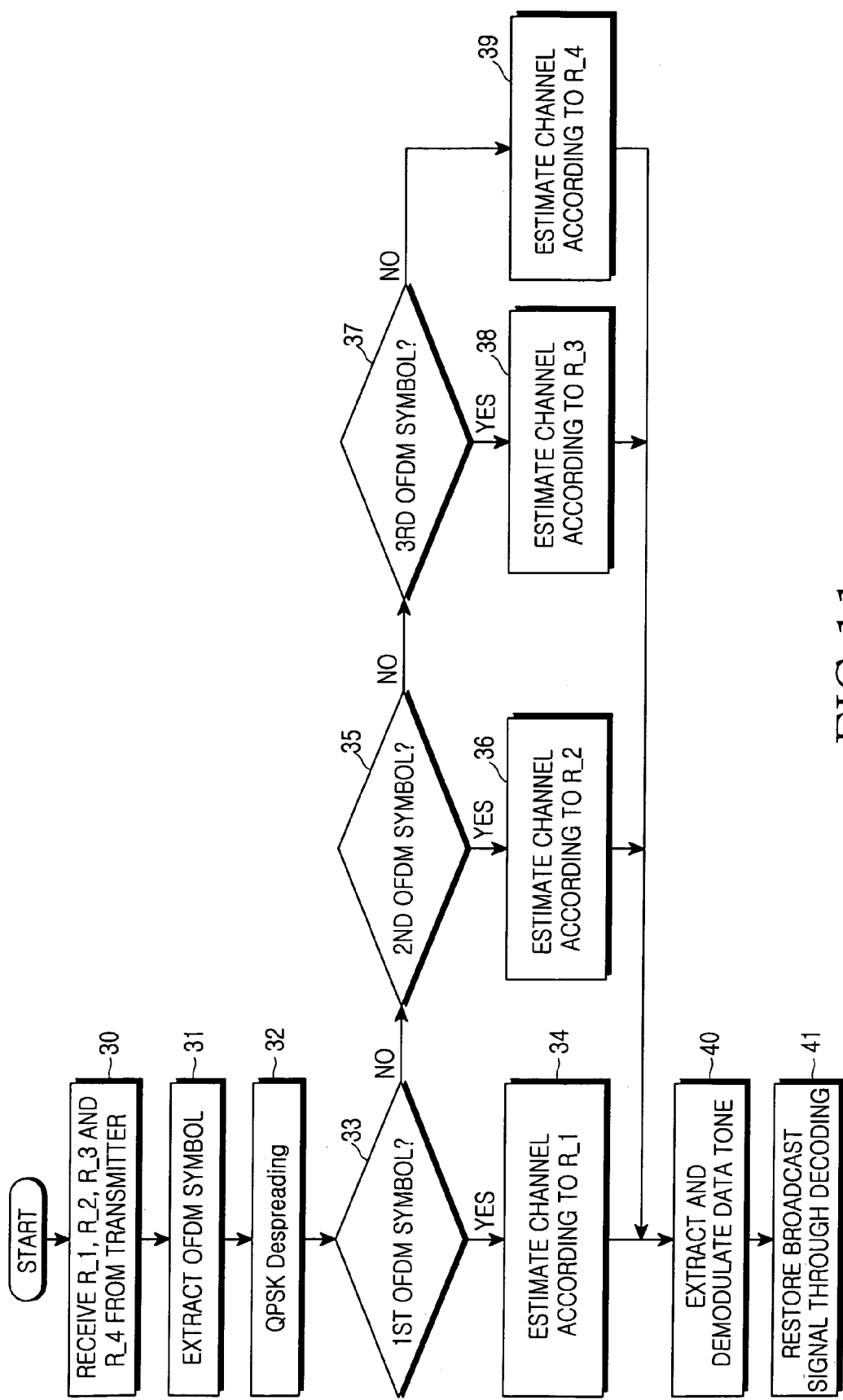
FIG. 11 is a flowchart illustrating an operation of a receiver in an HRPD system for broadcasting service according to another exemplary embodiment of the present invention.

With reference to FIG. 11, a description will now be made of a process of restoring a broadcasting signal at a receiver upon receiving the OFDM signal generated through the operation of FIG. 10.

FIG. 11 is a flowchart illustrating an operation of a receiver in an HRPD system for broadcasting service according to another exemplary embodiment of the present invention in which the receiver uses different pilot-to-data tone power ratios for individual positions of OFDM symbols. In an exemplary embodiment of the present invention, a receiver in an HRPD system for broadcasting service refers to a terminal.

In step 30, a receiver receives R_1, R_2, R_3 and R_4 from a base station, or a transmitter. Upon failure to receive the R_1, R_2, R_3 and R_4, the receiver uses initial R_1, R_2, R_3 and R_4 values. Upon receiving a BCMCS slot, the receiver extracts an OFDM symbol from the received BCMCS slot in step 31, and performs QPSK despreading on the extracted OFDM symbol in step 32.

The receiver determines in step 33 whether the OFDM symbol is located in the first position of the slot. If the OFDM symbol is a first OFDM symbol of the slot, the receiver performs channel estimation according to a pilot-to-data tone power ratio R_1 in step 34. Otherwise, the receiver determines in step 35 whether the OFDM symbol is located in the second position of the slot. If the OFDM symbol is a second OFDM symbol of the slot, the receiver performs channel estimation according to a pilot-to-data tone power ratio R_2 in step 36. Otherwise, the receiver determines in step 37 whether the OFDM symbol is located in the third position of the slot. If the OFDM symbol is a third OFDM symbol of the slot, the receiver performs channel estimation according to a pilot-to-data tone power ratio R_3 in step 38. Otherwise, because it indicates that the OFDM symbol is located in the last position of the slot, the receiver performs channel estimation according to a pilot-to-data tone power ratio R_4 in step 39. In the channel estimation processes of steps 34, 36, 38 and 39, the receiver uses pilot tones located in adjacent OFDM symbols.

In step 40, the receiver extracts data tones from the estimated channel and demodulates the extracted data tones. In step 41, the receiver finally decodes the demodulated data tones into the broadcasting signal transmitted from the transmitter.

As described above, the transmitter sets a different power ratio according to position of OFDM symbols in a slot in transmitting an OFDM signal. Upon receiving the OFDM signal, the receiver can perform channel estimation on the OFDM signal according to the corresponding power ratio, thereby improving channel estimation performance of OFDM symbols.

Figure 12:
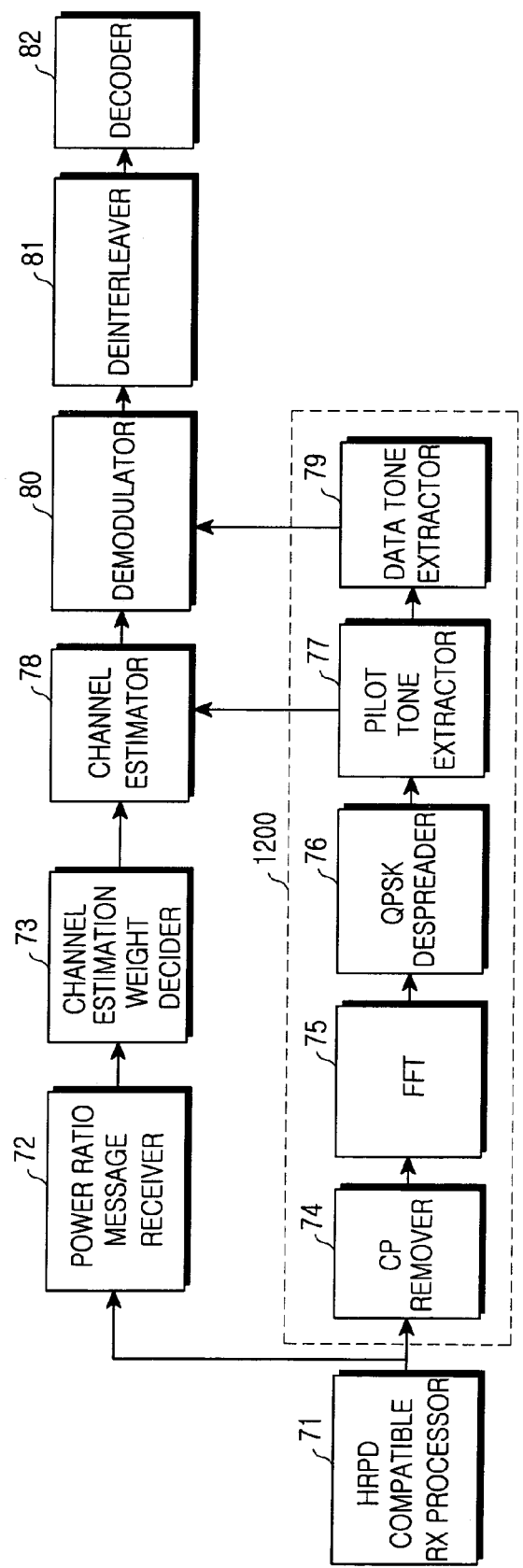
FIG. 12 is a block diagram illustrating a structure of a receiver for receiving an OFDM signal that a transmitter transmitted after setting a different power ratio depending on a position of an OFDM symbol, according to an embodiment of the present invention.

FIG. 12 is a block diagram illustrating a structure of a receiver for receiving an OFDM signal that a transmitter transmitted after setting a different power ratio depending on a position of an OFDM symbol, according to an embodiment of the present invention. With reference to FIG. 12, a description will now be made of a structure and operation of a receiver for receiving an OFDM signal that a transmitter transmitted after setting a different power ratio depending on a position of an OFDM symbol, according to an embodiment of the present invention.

The receiver is compatible with HRPD technology. Therefore, an HRPD compatible reception processor 71 receives an HRPD signal, extracts a partial signal mapped to data from the received HRPD signal, and determines whether the received data is OFDM data or CDM data. In case of broadcasting service, the HRPD compatible reception processor 71 can determine a transmission scheme of the received data by checking whether the MSB has a value '1' indicating the broadcasting service.

As described above, in the HRPD system, a receiver may either receive a broadcast signal that a transmitter transmitted by OFDM every slot, or receive a unicast signal or control signal that the transmitter transmitted by CDM every slot. A description will first be made of a method for receiving a CDM-transmitted control signal at a receiver in order to detect a pilot-to-data tone power ratio. Upon receiving a control signal or a power ratio signal from the HRPD system, the HRPD compatible reception processor 71 outputs the received signal to a power ratio message receiver 72. The power ratio message receiver 72 extracts a power ratio message from a CDM control signal, and outputs a power ratio value selected from the extracted power ratio message to a channel estimation weight decider 73. Herein, the term "power ratio" refers to a pilot-to-data tone power ratio.

The channel estimation weight decider 73 determines a weight for each individual channel, necessary for channel estimation, using the power ratio value, and outputs the determined channel estimation weight to a channel estimator 78.

Next, a description will be made of a method for receiving an OFDM-transmitted signal at the receiver. The OFDM-transmitted signal is input to an OFDM processor 1200. A data management process in the OFDM processor 1200 will now be described.

The OFDM processor 1200 provides the received OFDM signal to a CP remover 74 to remove a CP from the received OFDM signal. The CP remover 74 removes a CP contaminated by propagation delay and multipath delay from the received signal, and outputs the CP-removed signal to a Fast Fourier Transform (FFT) processor 75. The FFT processor 75 converts the input time-domain signal into a frequency-domain signal, and outputs the frequency-domain signal to a QPSK despreader 76. The QPSK despreader 76 QPSK-despreads the frequency-domain signal, and outputs the QPSK-despread signal to a pilot tone extractor 77. The reason why the QPSK despreader 76 QPSK-despreads the frequency-domain signal is because the transmitter QPSK-spread the transmission signal before transmission. The QPSK despreader 76 outputs guard tones, pilot tones and data tones on a mixed basis as shown in FIG. 3. The pilot tone extractor 77 extracts pilot tones from the QPSK-despread signal, outputs the extracted pilot tones to the channel estimator 78, and outputs the remaining tones to a data tone extractor 79. The data tone extractor 79 extracts only the tones mapped to data among the tones output from the pilot tone extractor 77, and outputs the extracted data tones to a demodulator 80.

The pilot tones extracted by the pilot tone extractor 77 are input to the channel estimator 78. The channel estimator 78 estimates a channel using the channel estimation weight determined by the channel estimation weight decider 73.

After the channel estimation, the channel estimator 78 outputs an estimated channel value to the demodulator 80. The demodulator 80 demodulates the data tones using the estimated channel value, and outputs a demodulated signal to a deinterleaver 81. The deinterleaver 81 deinterleaves the demodulated signal, and outputs the deinterleaved signal a decoder 82. The decoder 82 decodes the deinterleaved signal thereby restoring a transmitted signal, for example, a transmitted broadcasting signal.

Figure 13A:
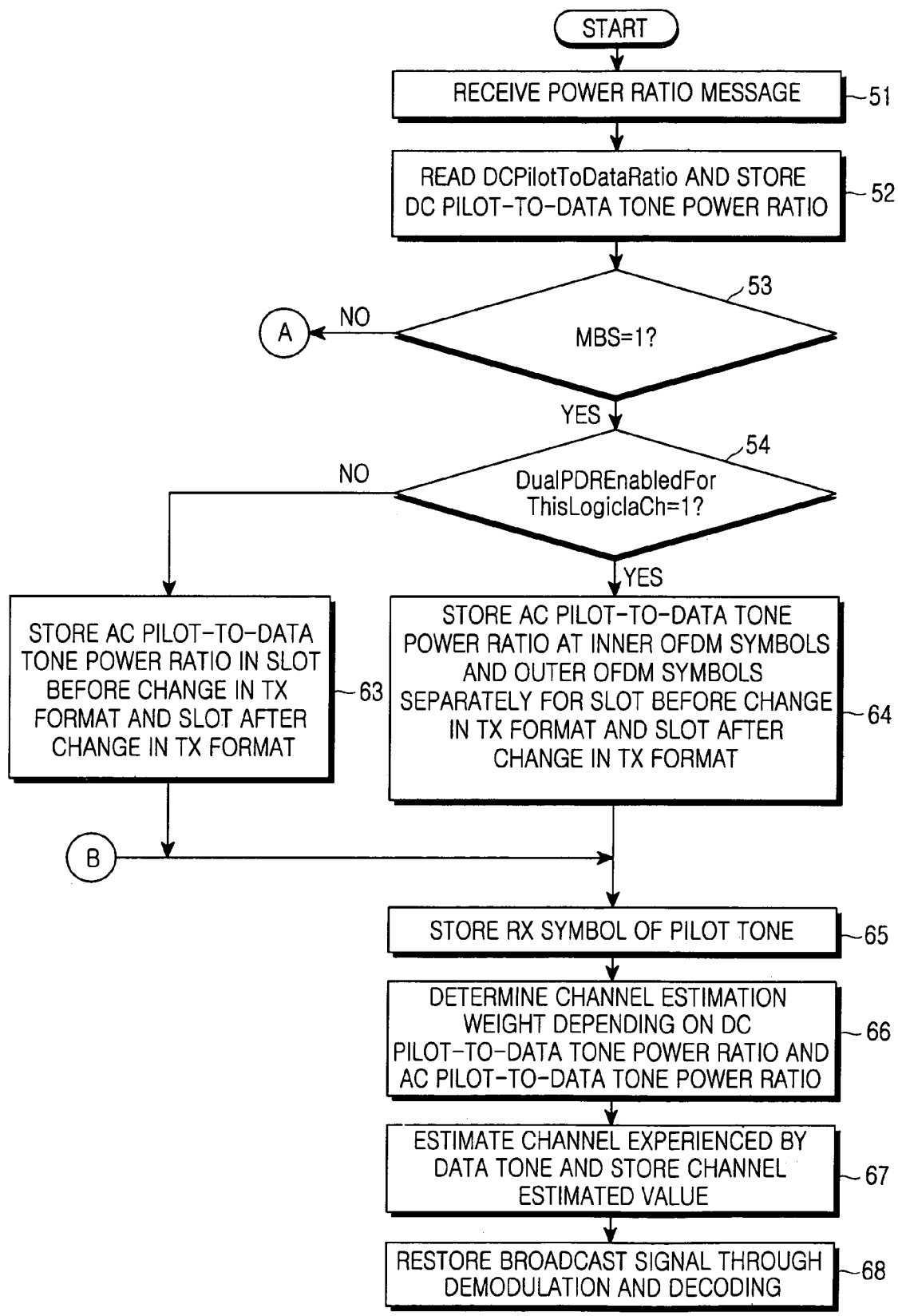
FIG. 13 is a flowchart illustrating a process of receiving an OFDM signal at a receiver in a HRPD system according to an embodiment of the present invention.
Figure 13B:
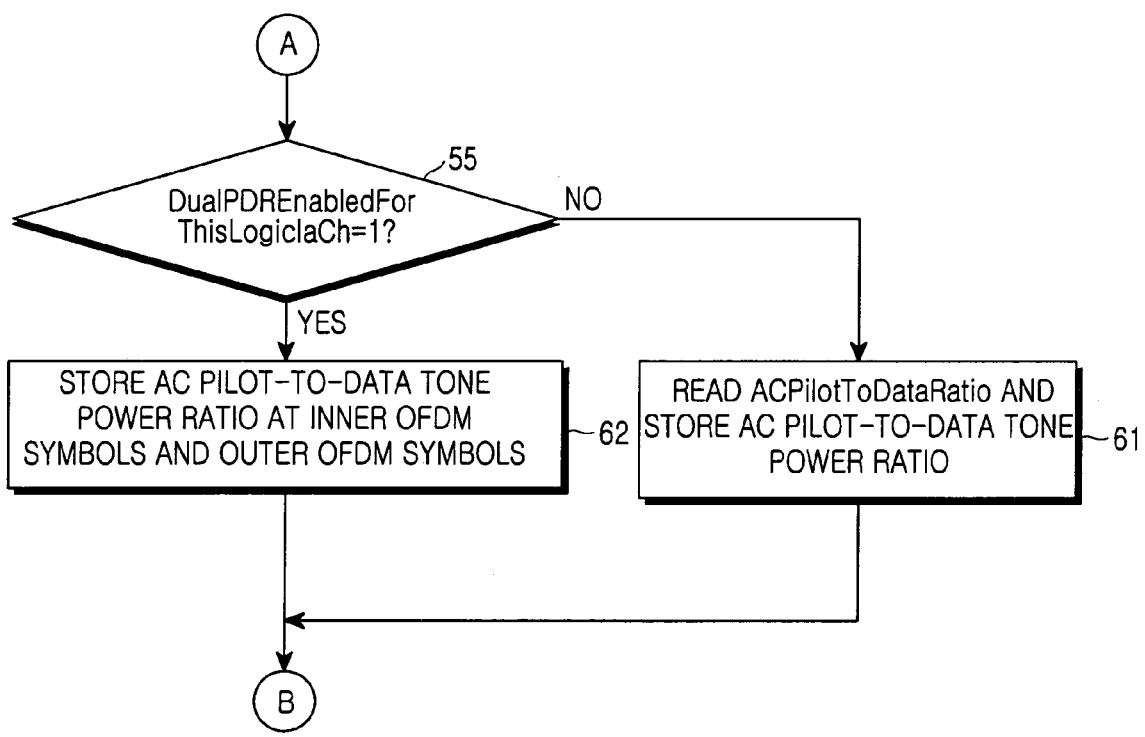

FIG. 13 is a flowchart illustrating a process of receiving an OFDM signal at a receiver in a HRPD system according to an embodiment of the present invention. With reference to FIG. 13, a detailed description will now be made of a process of receiving an OFDM signal at a receiver in a HRPD system according to an embodiment of the present invention.

Referring to FIG. 13, a receiver receives a power ratio message in step 51. The receiver receives the power ratio message in different ways according to transmission method. Upon receiving the power ratio message, the receiver determines an estimated channel value using a power ratio message receiver 72, a channel estimation weight decider 73 and a channel estimator 78. In step 52, the receiver reads a DCPilotToDataRatio field from the received power ratio message, and stores DC pilot-to-data tone power ratios. In this case, the receiver stores power information for pilot tones located in an outer side of a slot transmitting OFDM symbols and power information for pilot tones and data tones located in an inner side of the slot. Thereafter, the receiver determines in step 53 whether an MSB of an EBCMCSTranssimssionFormat field in the received message is set to '1'. If the MSB is set to '1', the receiver proceeds to step 54. Otherwise, the receiver proceeds to step 55.

In step 55, the receiver determines whether a value of a DualPDREnableForThisLogicalCh field is set to '1'. If it is determined that a value of the DualPDREnableForThisLogicalCh field is set to '1', the receiver proceeds to step 62. Otherwise, the receiver proceeds to step 61. In step 62, the receiver reads an ACPilotToDataRatioOuterSymbols field and an ACPilotToDataRatioInnerSymbols field regardless of the order of slots, and stores AC pilot-to-data tone power ratios at inner OFDM symbols and outer OFDM symbols. In step 61, the receiver reads an ACPilotToDataRatio field regardless of the order of slots and positions in the slots, and stores AC pilot-to-data tone power ratios.

In step 54, the receiver determines whether a value of a DualPDREnabledForThisLogicalCh field is set to '1'. If it is determined that a value of the DualPDREnabledForThisLogicalCh field is set to '1', the receiver proceeds to step 64. Otherwise, the receiver proceeds to step 63.

In step 64, the receiver reads an ACPilotToDataRatioOuterSymbols1 field and an ACPilotToDataRatioInnerSymbols1 field for a slot before a change in transmission format, and stores AC pilot-to-data tone power ratios at inner OFDM symbols and outer OFDM symbols. Further, the receiver reads an ACPilotToDataRatioOuterSymbols2 field and an ACPilotToDataRatioInnerSymbols2 field for a slot after a change in transmission format, and stores AC pilot-to-data tone power ratios at inner OFDM symbols and outer OFDM symbols.

In step 63, the receiver reads an ACPilotToDataRatio1 field and an ACPilotToDataRatio2 field regardless of positions of OFDM symbols in the slots, and stores AC pilot-to-data tone power ratios separately for a slot before a change in transmission format and a slot after a change in transmission format.

After step 61, 62, 63 or 64, the receiver stores reception symbols of the pilot tones in step 65. Thereafter, in step 66, the receiver determines a channel estimation weight depending on the stored DC pilot-to-data tone power ratios and AC pilot-to-data tone power ratios. In step 67, the receiver estimates a channel experienced by the data tones by combining and interpolating reception symbols of the pilot tones using the channel estimation weight, and stores the estimated channel value. In step 68, the receiver restores a broadcasting signal by performing demodulation and decoding on the data tones using the estimated channel value.

As can be understood from the foregoing description, an OFDM-based BCMCS transmission apparatus being compatible with HRPD technology sets a different pilot-to-data tone power ratio according to position of OFDM symbols, thereby improving channel estimation performance for the OFDM symbols located in the slot boundaries. The improvement of the channel estimation performance contributes to improvement in reception performance.

While the invention has been shown and described with reference to certain exemplary embodiment thereof, it will be understood by those skilled in the art that various changes in form and details may be made therein without departing from the spirit and scope of the invention as defined by the appended claims. For example, although exemplary embodiments of the present invention have been applied to a system in which BCMCS technology supports the OFDM transmission scheme in compatibility with HRPD technology, the embodiments can also be applied to another OFDM-based broadcasting system.

What is claimed is:

1. An apparatus for transmitting a OFDM symbol in a mobile communication system for broadcasting service, the apparatus comprising:
    a transmission processor for generating a modulated symbol by encoding, interleaving and modulating a physical layer packet to be transmitted, and arranging the modulated symbol in data tones of the OFDM symbol;
    a tone inserter for inserting guard tones and pilot tones into the OFDM symbol;
    a tone power allocator for setting a different pilot-to-data tone power ratio according to a position of the OFDM symbol in a slot, and allocating power according to the pilot-to-data tone power ratio; and
    a transmitter for transmitting the OFDM symbol;
    wherein the tone power allocator allocates power to the pilot tone and the data tone according to a first pilot-to-data tone power ratio if the OFDM symbol is located in an outer side of the slot, and allocates power to the pilot tone and the data tone according to a second pilot-to-data tone power ratio if the OFDM symbol is located in an inner side of the slot.

2. The apparatus of claim 1, wherein the tone power allocator sets a different pilot-to-data tone power ratio according to a position of the OFDM symbol in the slot, and transmits the pilot-to-data tone power ratio information through a signaling message.

3. The apparatus of claim 2, wherein the signaling message includes information on a DC pilot-to-data tone power ratio.

4. The apparatus of claim 2, wherein the signaling message comprises at least one of a field indicating whether the pilot-to-data tone power ratio information is included, a field including a pilot-to-data tone power ratio information used for transmission of inner OFDM symbol transmitted in the slot, and a field including a pilot-to-data tone power ratio used for transmission of outer OFDM symbol transmitted in the slot.

5. The apparatus of claim 2, wherein the signaling message comprises information on a pilot-to-data tone power ratio for applying a different pilot-to-data tone power ratio for each individual interlace during transmission of the OFDM symbol.

6. The apparatus of claim 2, wherein the signaling message comprises at least one of a field indicating whether the pilot-to-data tone power ratio information is included, fields each indicating whether information to be transmitted using each of interlaced slots is included, fields each including a pilot-to-data tone power ratio information used for transmission of inner OFDM symbol in the slot included in each interlace, and fields each including a pilot-to-data tone power ratio information used for transmission of outer OFDM symbol transmitted in the slot included in each interlace.

7. The apparatus of claim 1, wherein the tone power allocator applies a different pilot-to-data tone power ratio for each individual interlace during transmission of the OFDM symbol.

8. A method for transmitting a OFDM symbol in a mobile communication system for broadcasting service, the method comprising the steps of:
    generating a modulated symbol by encoding, interleaving and modulating a physical layer packet to be transmitted, and arranging the modulated symbol in data tones of OFDM symbol;
    inserting guard tones and pilot tones into the OFDM symbol;
    setting a different pilot-to-data tone power ratio according to a position of the OFDM symbol in a slot, and allocating power according to the pilot-to-data tone power ratio; and
    transmitting the OFDM symbol;
    wherein the tone power allocation step comprises the step of allocating power to the pilot tone and the data tone according to a first pilot-to-data tone power ratio if the OFDM symbol is located in an outer side of the slot, and allocating power to the pilot tone and the data tone according to a second pilot-to-data tone power ratio if the OFDM symbol is located in an inner side of the slot.

9. The method of claim 8, further comprising the step of setting a different pilot-to-data tone power ratio according to a position of the OFDM symbol in the slot, and transmitting the pilot-to-data tone power ratio information through a signaling message.

10. The method of claim 9, wherein the signaling message includes information on a DC pilot-to-data tone power ratio.

11. The method of claim 9, wherein the signaling message comprises at least one of a field indicating whether the pilot-to-data tone power ratio information is included, a field including a pilot-to-data tone power ratio information used for transmission of inner symbol transmitted in the slot, and a field including a pilot-to-data tone power ratio used for transmission of outer symbol transmitted in the slot.

12. The method of claim 9, wherein the signaling message comprises information on a pilot-to-data tone power ratio for applying a different pilot-to-data tone power ratio for each individual interlace during transmission of the OFDM symbol.

13. The method of claim 9, wherein the signaling message comprises at least one of a field indicating whether the pilot-to-data tone power ratio information is included, fields each indicating whether information to be transmitted using each of interlaced slots is included, fields each including a pilot-to-data tone power ratio information used for transmission of inner OFDM symbol transmitted in the slot included in each interlace, and fields each including a pilot-to-data tone power ratio information used for transmission of outer OFDM symbol transmitted in the slot included in each interlace.

14. The method of claim 8, wherein a different pilot-to-data tone power ratio is applied for each individual interlace during transmission of the OFDM symbol.

15. A method for receiving a OFDM symbol in a mobile communication system for broadcasting service, the method comprising the steps of:
upon receiving information on a pilot-to-data tone power ratio determined according to a position of the OFDM symbol, storing the pilot-to-data tone power ratio;
receiving the OFDM symbol and extracting data tones and pilot tones;
estimating a channel using the pilot tones and the pilot-to-data tone power ratio of the OFDM symbol; and
restoring data from the data tone using the channel estimation information.

16. The method of claim 15, wherein the channel estimation step comprises the step of estimating a channel according to a first pilot-to-data tone power ratio if the OFDM symbol is located in an outer side of the slot, and estimating a channel according to a second pilot-to-data tone power ratio if the OFDM symbol is located in an inner side of the slot.

17. The method of claim 15, wherein the data restoration step comprises the steps of:
demodulating the data tone using the channel estimated information;
deinterleaving the demodulated signal; and
decoding the deinterleaved signal.

18. An apparatus for receiving a OFDM symbol in a mobile communication system for broadcasting service, the apparatus comprising:
a receiving unit for receiving a control message, extracting a pilot-to-data tone power ratio according to a position of the OFDM symbol based on the control message;
an orthogonal frequency division multiplexing (OFDM) processor for extracting pilot tones and data tones, providing the pilot tones to a channel estimation unit, and outputting the data tones;
the channel estimation unit for estimating a channel response using the pilot tones and the pilot-to-data tone power ratio; and
a data restoration unit for restoring data from the data tone using channel estimation information provided from the channel estimation unit.

19. The apparatus of claim 18, wherein the data restoration unit comprises:
a demodulator for demodulating the data tone using channel estimated value provided from the channel estimation unit;
a deinterleaver for deinterleaving a demodulated signal; and
a decoder for decoding a deinterleaved signal.

* * * * *